(12) United States Patent
Matsuno et al.

(10) Patent No.: US 10,470,041 B2
(45) Date of Patent: Nov. 5, 2019

(54) CONTROL DEVICE, WIRELESS COMMUNICATION CONTROL METHOD, AND WIRELESS COMMUNICATION CONTROL PROGRAM

(71) Applicant: FUJITSU LIMITED, Kawasaki-shi, Kanagawa (JP)

(72) Inventors: Hiroshi Matsuno, Higashi-Osaka (JP); Takashi Okamura, Yokohama (JP); Shu Matsuoka, Shibyua (JP); Hidehiko Mayumi, Kawasaki (JP); Madoka Tomiya, Itami (JP); Mitsuru Okajima, Yokohama (JP); Takahiro Shimazaki, Kawasaki (JP); Kaoru Kenjo, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 131 days.

(21) Appl. No.: 15/389,895

(22) Filed: Dec. 23, 2016

(65) Prior Publication Data
US 2017/0188239 A1    Jun. 29, 2017

(30) Foreign Application Priority Data

Dec. 25, 2015  (JP) .................................. 2015-255108

(51) Int. Cl.
*H04L 29/06* (2006.01)
*H04W 12/08* (2009.01)
(Continued)

(52) U.S. Cl.
CPC ........... *H04W 12/08* (2013.01); *H04L 63/108* (2013.01); *H04W 12/06* (2013.01); *H04W 84/12* (2013.01)

(58) Field of Classification Search
None
See application file for complete search history.

(56) References Cited

U.S. PATENT DOCUMENTS

2008/0235375 A1* 9/2008 Reynolds .......... G06F 17/30902
709/225
2009/0249457 A1* 10/2009 Graff .................... G06F 21/33
726/6
(Continued)

FOREIGN PATENT DOCUMENTS

JP    2015-139104 A    7/2015
JP    2015-210784 A    11/2015

OTHER PUBLICATIONS

Office Action dated Jul. 9, 2019, issued in counterpart JP application No. 2015-255108, with English translation. (7 pages).

*Primary Examiner* — Andrew J Steinle
(74) *Attorney, Agent, or Firm* — Westerman, Hattori, Daniels & Adrian, LLP

(57) ABSTRACT

A control device includes a control unit configured to transmit a login screen including an input section for an answer to a questionnaire to a mobile terminal that is not permitted to access a wireless access network, when a connection request is received from the mobile terminal, receive login information and an answer to the questionnaire input in the login screen, and issue an access permission to the mobile terminal for communication through the wireless access network when reception of the answer to the questionnaire and authentication of the mobile terminal based on the login information are complete.

8 Claims, 26 Drawing Sheets

(51) Int. Cl.
*H04W 12/06* (2009.01)
*H04W 84/12* (2009.01)

(56) References Cited

U.S. PATENT DOCUMENTS

2013/0254856 A1* 9/2013 Krishan ................ H04L 63/083
 726/6
2015/0067782 A1* 3/2015 Choi ..................... H04L 63/102
 726/3

* cited by examiner

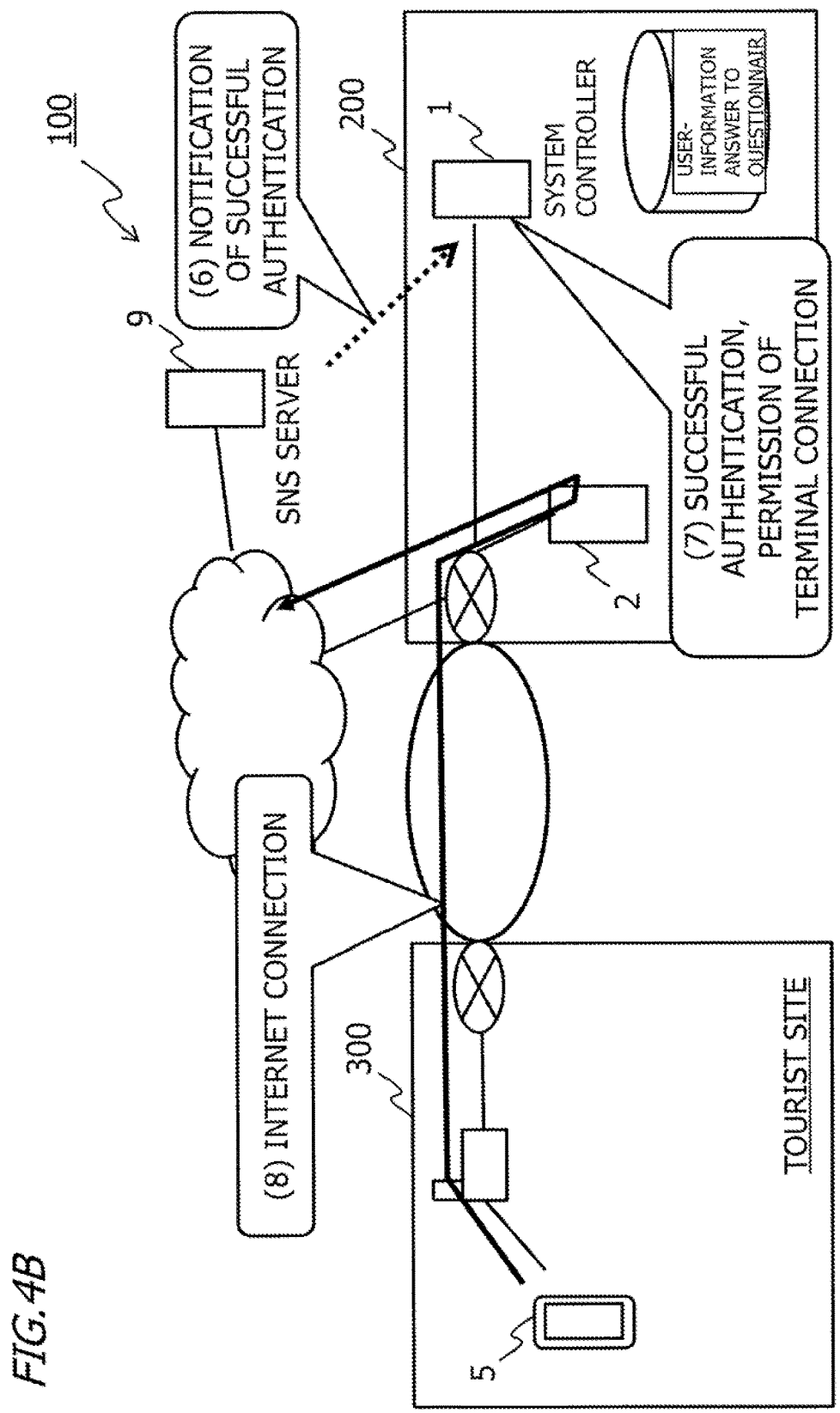

FIG.8

USER MANAGEMENT TABLE (1 RECORD)

| ITEM | REMARKS |
|---|---|
| USER MANAGEMENT ID | AUTOMATIC CREATION |
| IP ADDRESS | |
| TRAIL TYPE ID | REFER TO TRAIL TYPE MASTER |
| TRAIL INFORMATION | PASSWORD AUTHENTICATION: EMAIL ADDRESS<br>SNS AUTHENTICATION: ACCOUNT NAME |
| TEMPORARY AUTHENTICATION INFORMATION | PASSWORD AUTHENTICATION: EMAIL ADDRESS<br>SNS AUTHENTICATION: TEMPORARY ACCOUNT NAME |
| USER ID | JUST FOR PASSWORD AUTHENTICATION |
| PASSWORD | JUST FOR PASSWORD AUTHENTICATION |
| RESTRICTED AUTHENTICATION START TIME | |
| RESTRICTED AUTHENTICATION END TIME | |
| NUMBER OF TIMES OF RESTRICTED AUTHENTICATION CONNECTION | NUMBER OF TIMES OF EXECUTION OF RESTRICTED AUTHENTICATION FOR ONE DAY |
| LAST USE DATE/TIME | |
| NUMBER OF TIMES OF USE | NUMBER OF TIMES OF RESTRICTION AUTHENTICATION |

FIG.9

CONNECTION TERMINAL MANAGEMENT TABLE
(1 RECORD)

| ITEM | REMARKS |
|---|---|
| TRAIL INFORMATION | PASSWORD AUTHENTICATION: EMAIL ADDRESS SNS AUTHENTICATION: ACCOUNT NAME |
| MAC ADDRESS | |
| IP ADDRESS | |
| AUTHENTICATION START TIME | |
| AUTHENTICATION END TIME | |
| AUTHENTICATION STATE ID | REFER TO AUTHENTICATION STATE MASTER |

*FIG.10*

AUTHENTICATION STATE MASTER

| AUTHENTICATION STATE ID | AUTHENTICATION STATE |
|---|---|
| 0 | UNAUTHENTICATED |
| 1 | AUTHENTICATED |
| 2 | RESTRICTED AUTHENTICATION |

FIG.11

TRAIL TYPE MASTER

| TRAIL TYPE ID | TRAIL TYPE | NUMBER OF SIMULTANEOUS CONNECTIONS | AUTHENTICATION MAINTAINING TIME PERIOD |
|---|---|---|---|
| 0 | NO AUTHENTICATION | 0 | |
| 1 | PASSWORD AUTHENTICATION | 5 | |
| 2 | SNS AUTHENTICATION | 1 | |

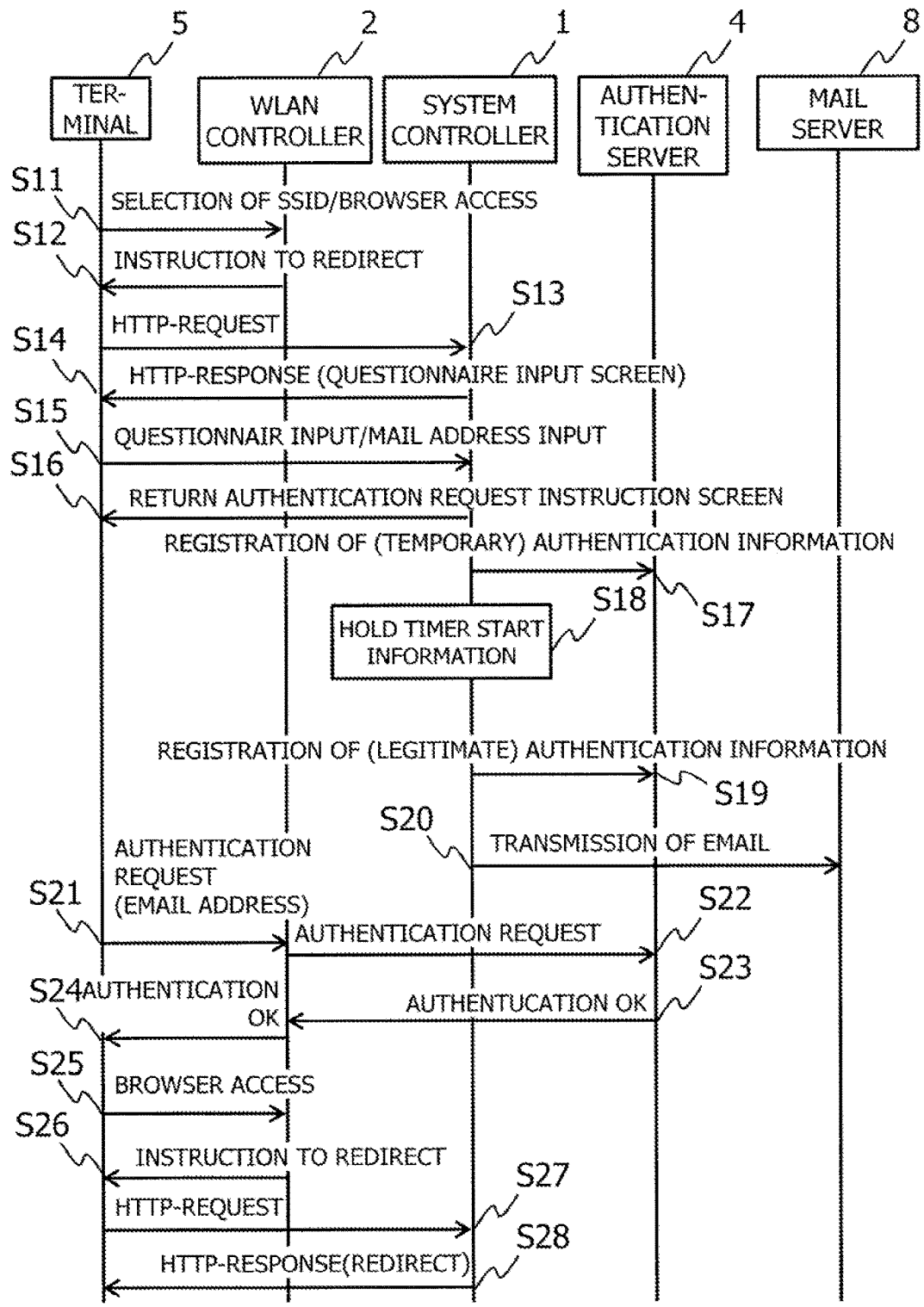

US 10,470,041 B2

CONTROL DEVICE, WIRELESS COMMUNICATION CONTROL METHOD, AND WIRELESS COMMUNICATION CONTROL PROGRAM

CROSS-REFERENCE TO RELATED APPLICATION

This application is based upon and claims the benefit of priority of the prior Japanese Patent Application No. 2015-255108, filed on Dec. 25, 2015, the entire contents of which are incorporated herein by reference.

FIELD

The present invention relates to a control device, a wireless communication control method, and a wireless communication control program.

BACKGROUND

For example, there is a service of providing a free wireless LAN environment to tourists at tourist sites and the like. In many cases, one object of the service for providing a wireless LAN at a tourist site is to provide tourist information about the tourist site to tourists, for example.

Patent Document

[Patent Document 1] Japanese Patent Laid-Open No. 2015-139104

However, because the system at a tourist site does not possess information about a tourist, it is difficult to provide information according to the demand or an attribute of the tourist. Questionnaires are conceivable as an example of a method for collecting information about demands and attributes of tourists, but not all the tourists would answer questionnaires.

SUMMARY

An aspect of the present invention is a control device including a control unit. The control unit is configured to transmit a login screen including an input section for an answer to a questionnaire to a mobile terminal that is not permitted to access a wireless access network, when a connection request is received from the mobile terminal. The control unit is configured to receive login information and an answer to the questionnaire input in the login screen, and issue an access permission to the mobile terminal for communication through the wireless access network when reception of the answer to the questionnaire and authentication of the mobile terminal based on the login information are complete.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4B is a diagram illustrating an example of the login process for a case where SNS authentication is performed;

FIG. 8 is a diagram illustrating an example of information that is stored as one record in a user management table;

FIG. 9 is a diagram illustrating an example of information that is stored as one record in a connection terminal management table;

FIG. 10 is an example of an authentication state master;

FIG. 11 is an example of a trail type master;

FIG. 12BA is an example of the flow chart of the process of the system controller for a case where a browser access is received from a user;

FIG. 12DA is an example of the flow chart of the process of the system controller for a case where a browser access is received from a user;

FIG. 14A is an example of a sequence for a case where password authentication is selected;

DESCRIPTION OF EMBODIMENT

Hereinafter, an embodiment of the present invention will be described based on the drawings. The configuration of the following embodiment is merely an example, and the present invention is not limited to the configuration of the embodiment.

First Embodiment

Figure 1:
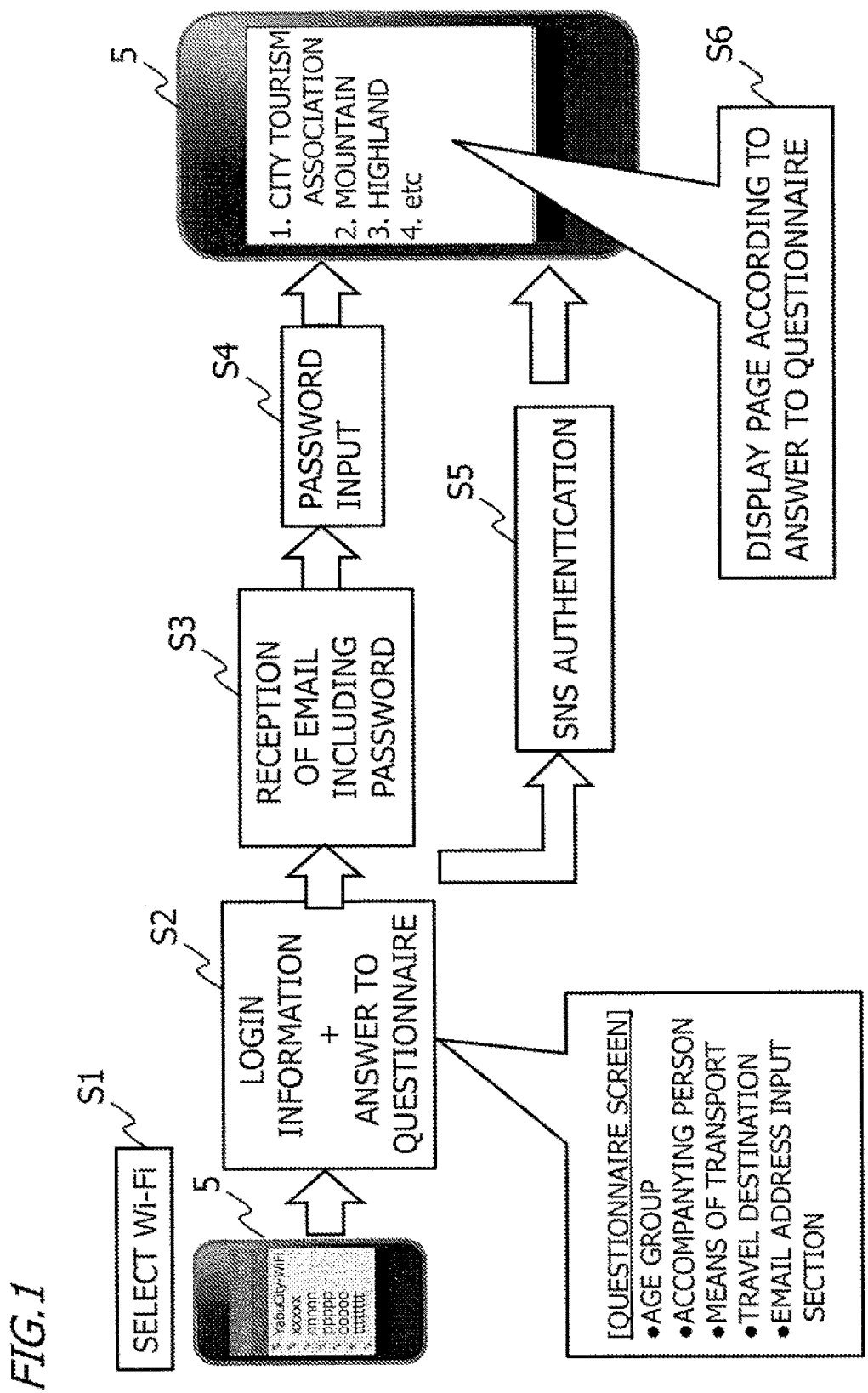
FIG. 1 is a diagram illustrating an example of a login process of a wireless communication system according to a first embodiment.

FIG. 1 is a diagram illustrating an example of a login process of a wireless communication system according to a first embodiment. In S1, an SSID of WIFI of a wireless communication system according to the first embodiment is selected and a browser is activated by a user of a mobile terminal 5, and connection of the mobile terminal 5 to a wireless LAN is started.

In S2, a login screen is displayed on the mobile terminal 5. A questionnaire and an answer section for the questionnaire, and options for an authentication method are included in the login screen. In the first embodiment, the authentication method may be selected from authentication by a login password that is sent by an email and authentication by an SNS. In the following, authentication by a login password will be simply referred to as password authentication. In the following, authentication by an SNS will be simply referred to as SNS authentication.

In the case where password authentication is selected, an email address which is the notification destination of a password is input and transmitted, for example. In the case where SNS authentication is selected, information that user authentication by an SNS is to be used is transmitted, for example. The contents of a questionnaire are the age group of the user, the type of accompanying person (family, friend, etc.), means of transport, a travel destination, and the like.

In S3, the mobile terminal 5 receives, from the wireless communication system, an email including a login password for a wireless LAN service, in response to transmission of an answer to a questionnaire and an email address. In S4, the user activates the browser, and inputs the password which has been sent by an email in a password input screen.

In S5, SNS authentication is selected by the user, and authentication of the user of the mobile terminal 5 is performed by an SNS server. In S6, authentication of the user of the mobile terminal 5 is successful, and a page according to the result of the answer to the questionnaire input in S2 is displayed on the mobile terminal 5.

In the first embodiment, in the case where an input section for an answer to a questionnaire is included in the login screen for a wireless LAN service, but the questionnaire is not answered, login to the wireless LAN service is not allowed. That is, in the first embodiment, users who can use a wireless LAN service are limited to those who answer a questionnaire. Accordingly, the rate of answer to a questionnaire may be increased. Also, by providing an input section for an answer to a questionnaire on the login screen, screen operations by a user for the questionnaire may be reduced, and the efficiency may be increased.

Furthermore, in the first embodiment, although use of a wireless LAN before authentication is not allowed, use of the wireless LAN by the mobile terminal 5 is permitted with restrictions for reception of an email for password notification and for SNS authentication. Accordingly, even if the mobile terminal 5 is a terminal not provided with a communication function other than WIFI, a procedure for using the wireless LAN service may be taken on site with no advance preparation.

Additionally, an answer to a questionnaire is information that is not used for authentication of the user of the mobile terminal 5. Also, Facebook (registered trademark), twitter (registered trademark) and the like may be cited as the SNS, for example.

System Configuration

Figure 2:
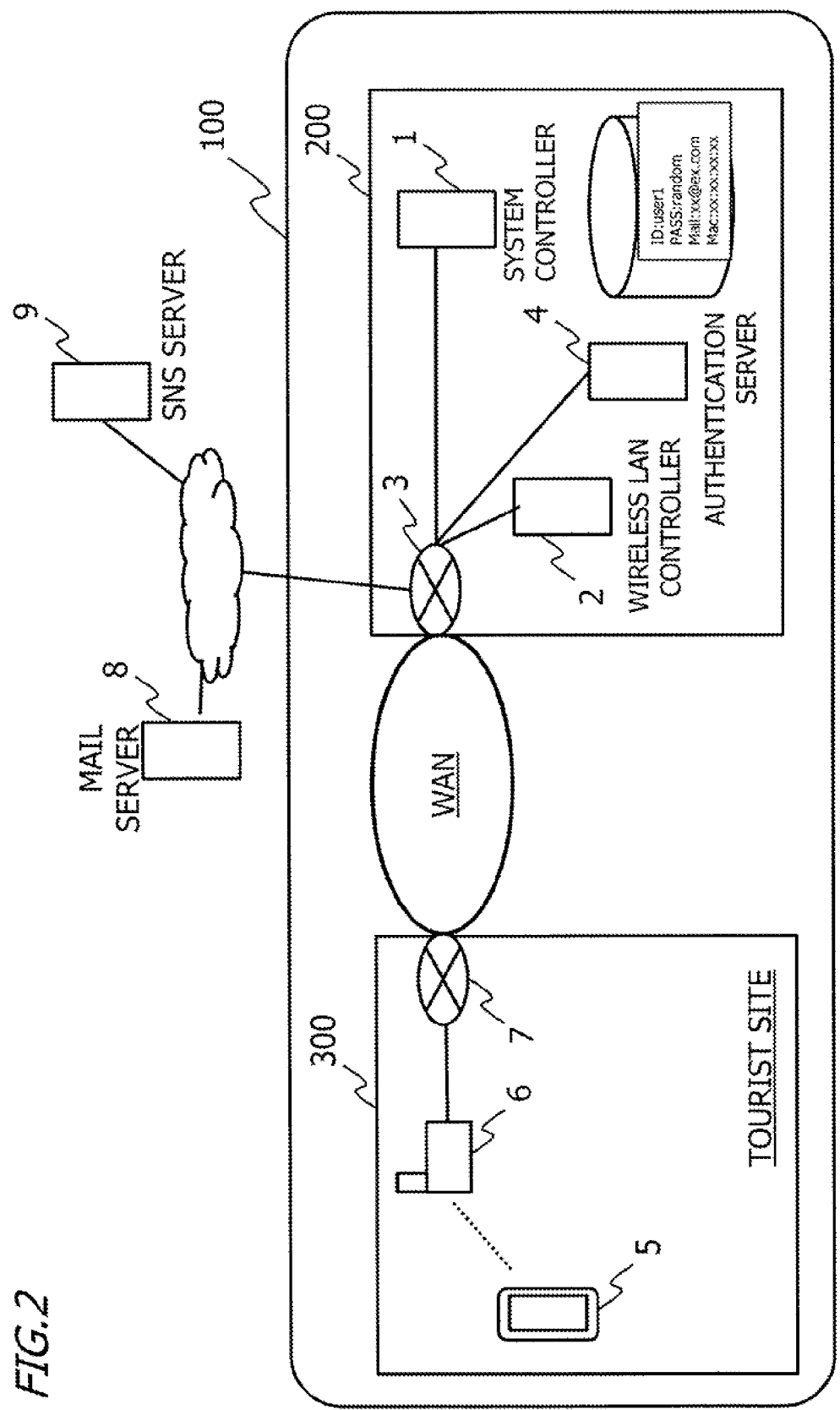
FIG. 2 is a diagram illustrating an example of a system configuration of the wireless communication system according to the first embodiment.

FIG. 2 is a diagram illustrating an example of a system configuration of a wireless communication system 100 according to the first embodiment. The wireless communication system 100 includes a management system 200 and a tourist site network 300. The management system 200 and the tourist site network 300 are connected by a WAN (Wide Area Network).

The tourist site network 300 includes the mobile terminal 5, a WIFI AP 6, and a border router 7. Although a plurality of mobile terminals 5 and WIFI Aps 6 are included, one each is illustrated in FIG. 2 for the sake of convenience. The mobile terminal 5 and the WIFI AP 6 are connected by WIFI wireless communication. The WIFI AP 6 and the border router 7 are connected in a wired manner by a LAN, for example.

The management system 200 is a system for managing the tourist site network 300. The management system 200 includes a system controller 1, a wireless LAN controller 2, a border router 3, and an authentication server 4. The system controller 1, the wireless LAN controller 2, the border router 3, and the authentication server 4 are connected by a LAN, for example.

The system controller 1 is a device for managing the wireless communication system 100 and the management system 200. In the first embodiment, the system controller 1 performs, as one process, a process regarding control of user authentication for the mobile terminal 5.

The wireless LAN controller 2 manages and controls the WIFI AP 6. For example, the wireless LAN controller 2 performs setting of all the WIFI Aps 6 in the tourist site network 300 in a centralized manner. The WIFI APs 6 in the tourist site network 300 transfer all the communication to the wireless LAN controller 2. That is, communication of all the mobile terminals 5 connected to the WIFI APs 6 passes through the wireless LAN controller 2.

The wireless LAN controller 2 is positioned geographically away from the tourist site network 300, and is included in the management system 200, but because it controls the WIFI AP 6, it is a structural element of a wireless access network, together with the WIFI AP 6.

In the first embodiment, the wireless LAN controller 2 performs user authentication by using the authentication server 4. The wireless LAN controller 2 redirects communication of an unauthenticated mobile terminal 5 to the system controller 1.

The authentication server 4 performs an authentication process in response to a request from the wireless LAN controller 2. The authentication server 4 compares authentication information that is registered and authentication information that is transmitted from mobile terminal 5 against each other, and if the information pieces match each other, the authentication server 4 determines successful authentication of the mobile terminal 5.

Additionally, in the case where the system controller 1, the wireless LAN controller 2, and the border router 3 construct an SDN network in the management system 200, the system controller 1 may be mounted in a device that operates as an SDN controller.

Figure 3A:
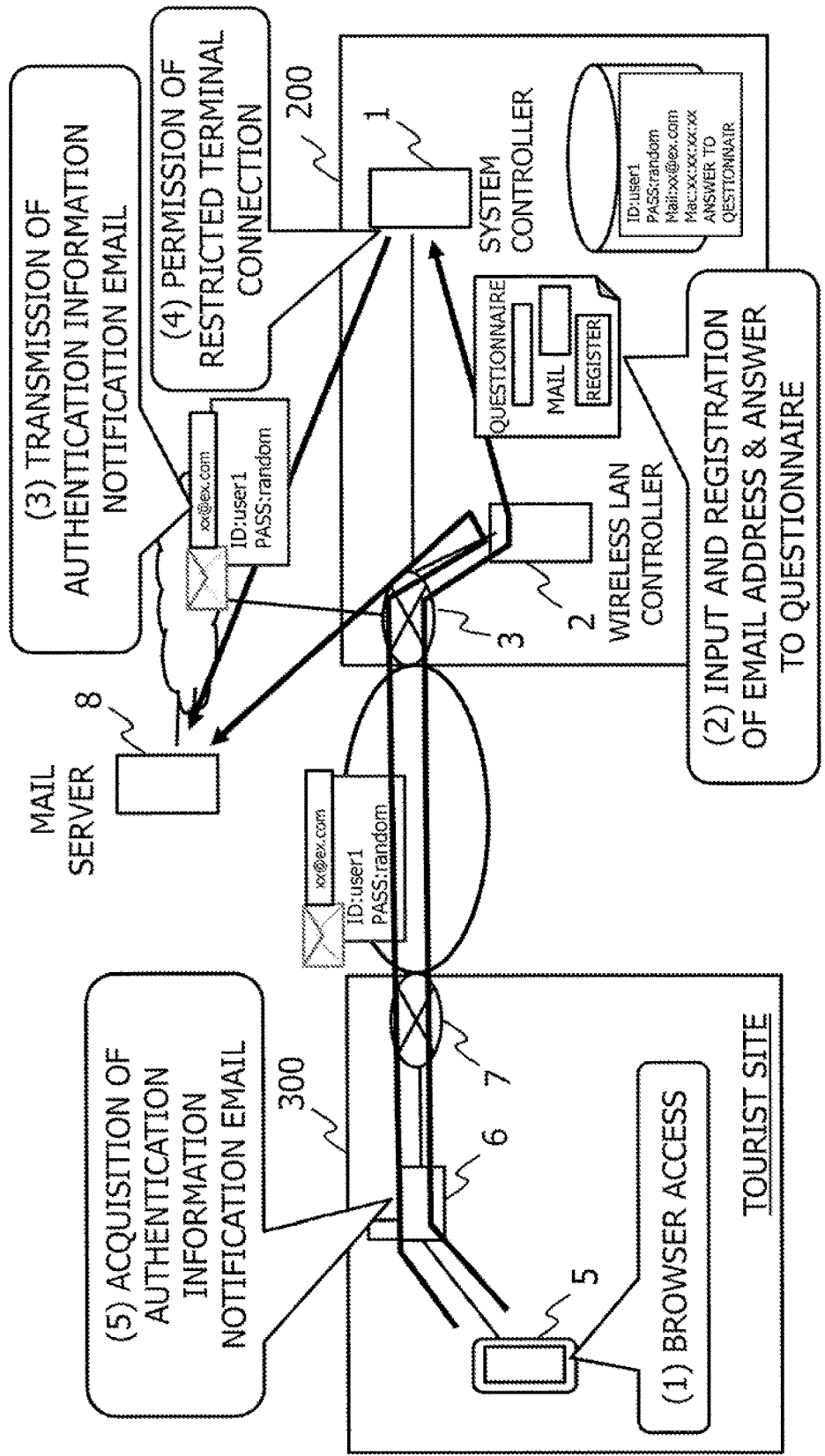
FIG. 3A is a diagram illustrating an example of a login process for a case where password authentication is performed.
Figure 3B:
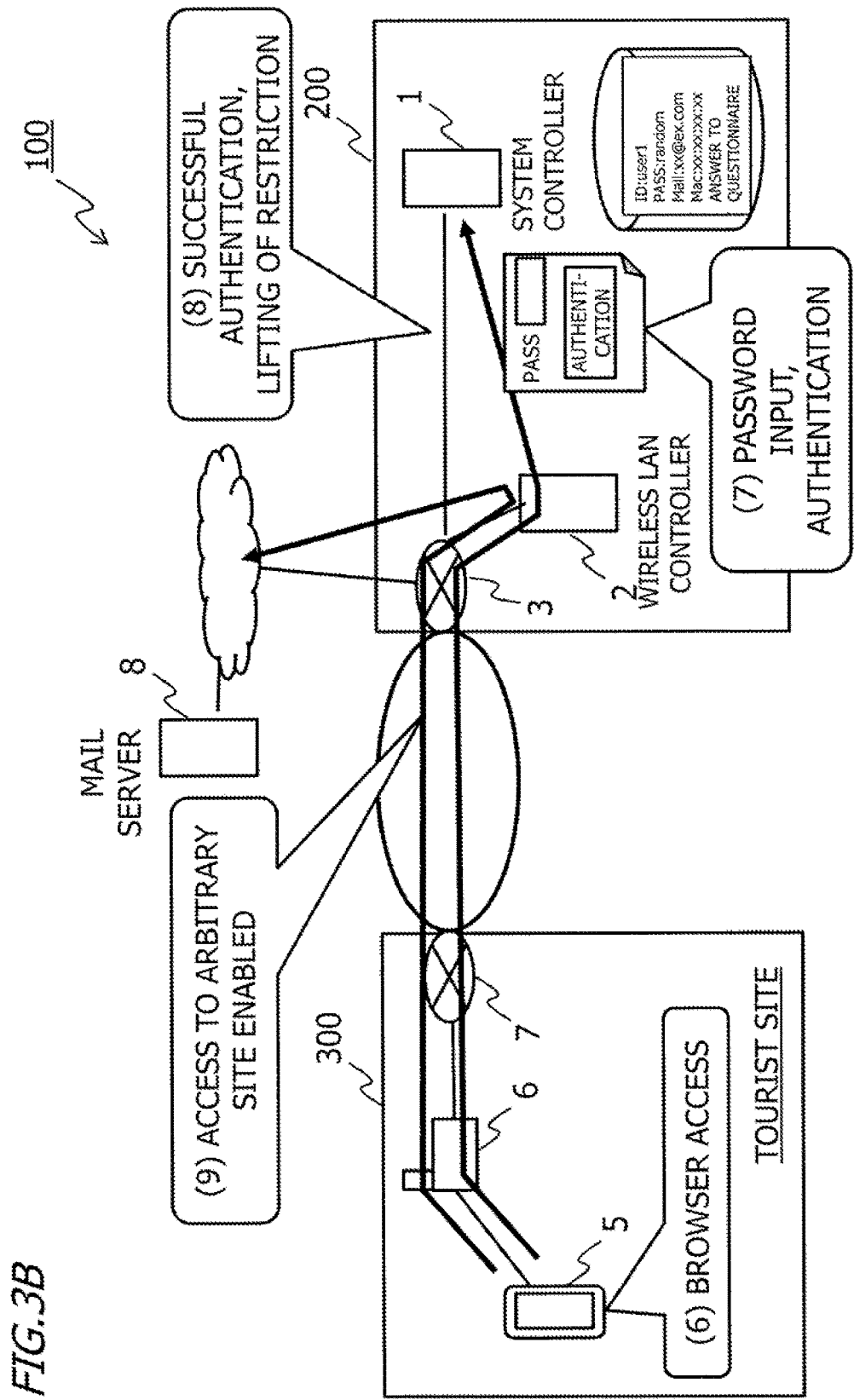
FIG. 3B is a diagram illustrating an example of the login process for a case where password authentication is performed.

FIGS. 3A and 3B are diagrams illustrating an example of a login process for a case where password authentication is performed. In FIGS. 3A and 3B, the authentication server 4 is omitted for the sake of convenience. In FIG. 3A, it is assumed that an SSID of the WIFI AP 6 is selected by the mobile terminal 5, and a process up to acquisition of an IP address of the mobile terminal 5 is complete.

(1) An access from the mobile terminal 5 by a browser is caused by a user operation. Communication of the mobile terminal 5 all passes through the wireless LAN controller 2. The wireless LAN controller 2 redirects communication from an unauthenticated terminal to the system controller 1. Accordingly, the browser access from the mobile terminal 5 is redirected to the system controller 1.

(2) A login screen including an answer section for a questionnaire and options for login information is transmitted to the mobile terminal 5 from the system controller 1, and an answer to the questionnaire and an email address are transmitted from the mobile terminal 5 to the system controller 1 by a user operation. The system controller 1 saves the answer to the questionnaire and the email address received from the mobile terminal 5, identification information of the mobile terminal 5 and the like.

(3) The system controller 1 transmits an email including a user ID and a login password with the email address sent from the mobile terminal 5 as the destination. In the following, the email including a login password will be referred to as an authentication information notification email. The authentication information notification email is delivered to an external email server 8 according to the email address.

(4) The system controller 1 performs a process for permitting communication from the mobile terminal 5 with restrictions so as to permit the mobile terminal 5 to receive the authentication information notification email. The specific process will be described later. The wireless LAN controller 2 permits communication of the mobile terminal 5 based on the process of the system controller 1. This is because communication of the mobile terminal 5 all passes through the wireless LAN controller 2. In the first embodiment, the system controller 1 takes a time restriction as a restriction on the communication of the mobile terminal 5. That is, in the first embodiment, the system controller 1 performs a process to permit communication of the mobile terminal 5 until a lapse of a predetermined time period. The mobile terminal 5 is allowed to connect to Internet for the predetermined time period.

(5) The mobile terminal 5 acquires the authentication information notification email from the email server 8 by a user operation. Communication for receiving the authentication information notification email passes through the wireless LAN controller 2, but because communication is permitted within the restriction time, the mobile terminal 5 is able to receive the authentication information notification email.

In (6) in FIG. 3B, a browser access from the mobile terminal 5 is caused by a user operation. The browser access from the mobile terminal 5 is redirected to the system controller 1 by the wireless LAN controller 2. The system controller 1 transmits a login screen to the mobile terminal 5.

(7) The user ID and the login password sent to the mobile terminal 5 by the authentication information notification email are input by a user operation, and are transmitted to the system controller 1.

(8) User authentication for the mobile terminal 5 is performed by the wireless LAB controller 2 and the authentication server 4. The authentication server 4 performs authentication of the user of the mobile terminal 5 based on whether the user ID and the password received from the mobile terminal 5 match the user ID and the password that are saved. When user authentication for the mobile terminal 5 succeeds, the system controller 1 lifts the restriction on the communication of the mobile terminal 5.

(9) Because the restriction on the mobile terminal 5 is lifted, the mobile terminal 5 is allowed to connect to any site on the Internet.

Figure 4A:
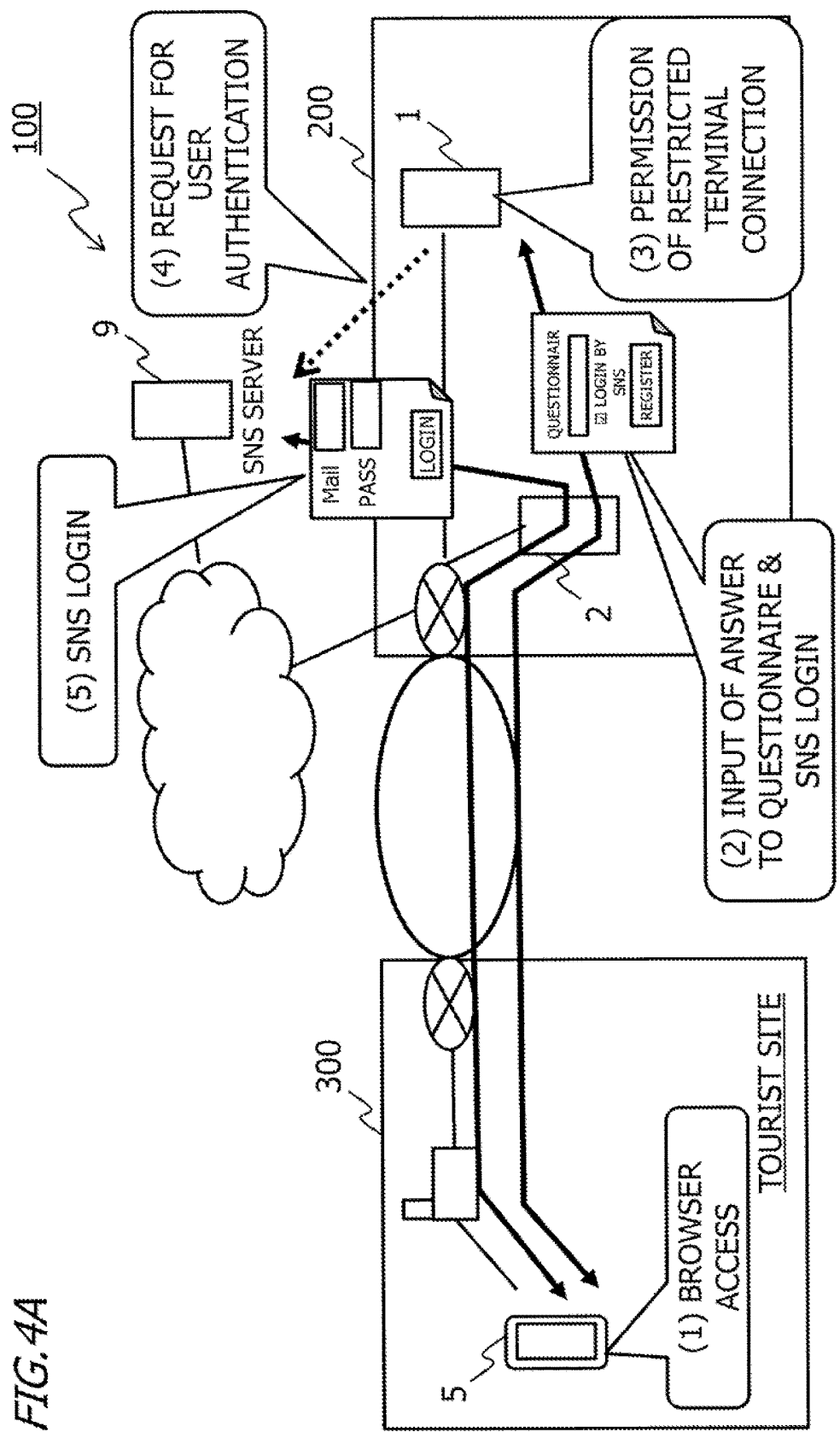
FIG. 4A is a diagram illustrating an example of a login process for a case where SNS authentication is performed.

FIGS. 4A and 4B are diagrams illustrating an example of a login process for a case where SNS authentication is performed. In FIGS. 4A and 4B, the authentication server 4 is omitted for the sake of convenience. In FIG. 4A, it is assumed that an SSID of the WIFI AP 6 is selected by the mobile terminal 5, and a process up to acquisition of an IP address of the mobile terminal 5 is complete.

(1) An access from the mobile terminal 5 by a browser is caused by a user operation, and is redirected by the wireless LAN controller 2 to the system controller 1.

(2) A login screen is transmitted to mobile terminal 5 from the system controller 1, and an answer to a questionnaire and that login by an SNS is selected are transmitted from the mobile terminal 5 to the system controller 1 by a user operation. The system controller 1 saves the answer to the questionnaire received from the mobile terminal 5, identification information of the mobile terminal 5, and the like.

(3) The system controller 1 performs a process for permitting communication from the mobile terminal 5 with restrictions so as to permit the mobile terminal 5 to perform communication with an external SNS server 9 for user authentication. The specific process will be described later. The wireless LAN controller 2 permits communication of the mobile terminal 5 based on the process of the system controller 1. The restriction in this case is a time restriction, as in the case where password authentication is selected. The mobile terminal 5 is allowed to connect to the Internet for the predetermined time period.

(4) The system controller 1 requests the external SNS server 9 for authentication of the user of the mobile terminal 5.

(5) User authentication for an SNS is performed between the SNS server 3 and the mobile terminal 5. Communication for user authentication for an SNS passes through the wireless LAN controller 2, but because communication is permitted within the restriction time, the mobile terminal 5 is able to login to the SNS.

In (6) in FIG. 4B, when user authentication for the mobile terminal 5 succeeds, the SNS server 9 notifies the system controller 1 of the authentication success. A protocol of OAuth or the like is used for request for authentication and exchange of responses between the system controller 1 and the SNS server 9, for example.

(7) The system controller 1, lifts the restriction on the communication of the mobile terminal 5. The restriction on the communication of the mobile terminal 5 is thereby lifted.

(8) Because the restriction on the mobile terminal 5 is lifted, the mobile terminal 5 is allowed to connect to the Internet.

Device Configuration

Figure 5:
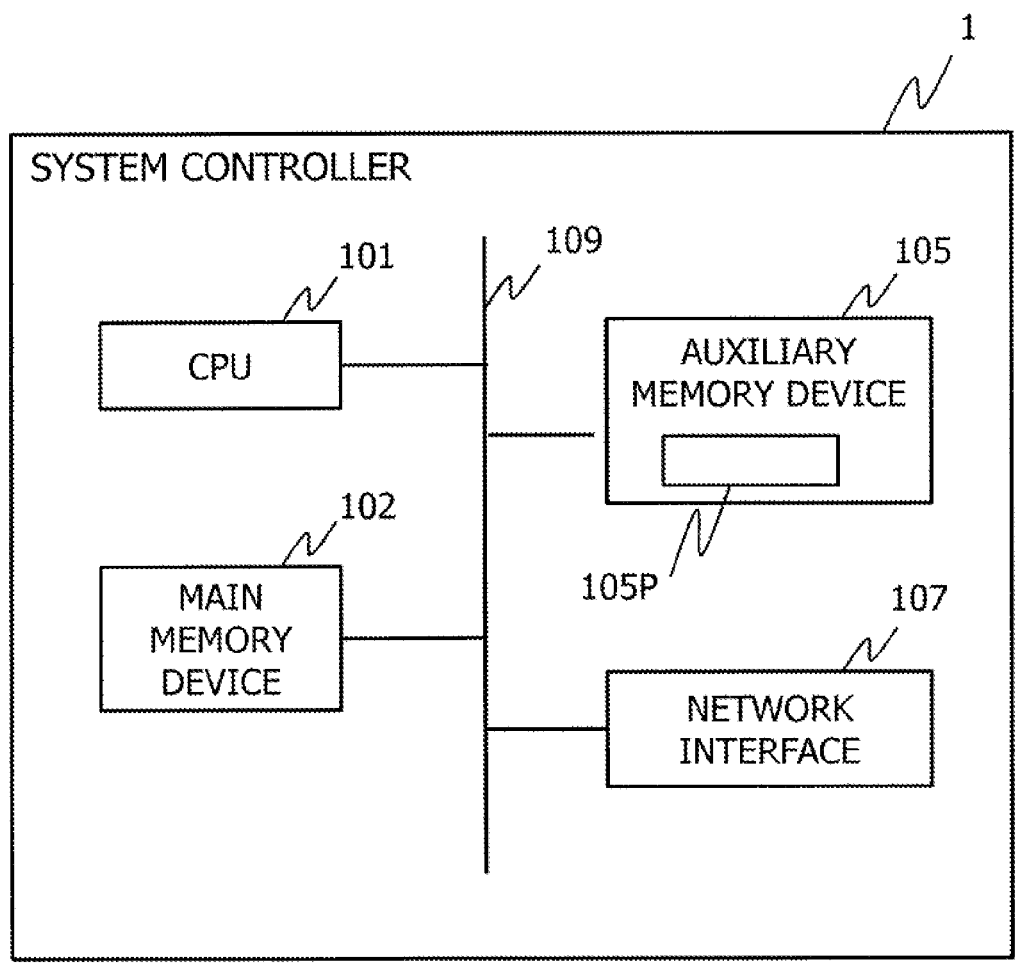
FIG. 5 is an example of a hardware configuration of a system controller.

FIG. 5 is an example of a hardware configuration of the system controller 1. For example, the system controller 1 is a dedicated computer such as a server. The system controller 1 is an example of a "control device".

The system controller 1 includes a CPU (Central Processing Unit) 101, a main memory device 102, an auxiliary memory device 105, and a network interface 107. These are interconnected by a bus 109.

The auxiliary memory device 105 stores an OS (Operating System), various programs, and data toe used by the CPU 101 at the time of execution of each program. For example, the auxiliary memory device 105 is a non-volatile memory, such as an EPROM (Erasable Programmable ROM), a flash memory, or a hard disc drive. The auxiliary memory device 105 stores a login control program 105P, for example. The login control program 105P is a program for permitting login of a terminal under the conditions of successful user authentication and acquisition of an answer to a questionnaire.

The main memory device 102 is a memory device for providing the CPU 101 with a memory area for loading a program stored in the auxiliary memory device 105 and a work area, or for being used as a buffer. The main memory device 102 includes a semiconductor memory, such as a ROM (Read Only Memory), a RAM (Random Access Memory) or the like.

The CPU 101 loads the OS and various application programs held by the auxiliary memory device 105 to the main memory device 102, and executes the same to perform various processes. A plurality of CPUs 101 may be provided without being limited to one. The CPU 101 is an example of a "control unit".

The network interface 107 is an interface for performing input/output of information with respect to a network. The network interface 107 may be an interface that connects to a wired network, or an interface that connects to a wireless network. For example, the network interface 107 is an NIC (Network Interface Card) or the like.

Additionally, the hardware configuration of the system controller 1 illustrated in FIG. 5 is an example and is not restrictive, and structural elements may be omitted, replaced or added as appropriate according to the embodiment. For example, the system controller 1 may include a removable recording medium drive device, and execute a program recorded in the removable recording medium. For example, the removable recording medium is a recording medium such as an SD card, a miniSD card, a microSD card, a USB (Universal Serial Bus) flash memory, a CD (Compact Disc), a DVD (Digital Versatile Disc), a Blu-ray (registered trademark) Disc, or a flash memory card. Also, for example, the system controller 1 may include an input device and an output device. The input device is a keyboard or a mouse, for example. The output display is a display, for example.

The wireless LAN controller 2 and the authentication server 4 are also dedicated computers such as servers, for example, and have almost the same hardware configuration as the hardware configuration of the system controller 1 illustrated in FIG. 5. The mobile terminal 5 is a smartphone or a tablet terminal, for example. The mobile terminal 5 includes a CPU, a ROM, a RAM, a non-volatile memory, a touch panel, a display, a WiFi communication unit, a microphone, a speaker and the like. The mobile terminal 5 is an example of a "mobile terminal".

Figure 6:
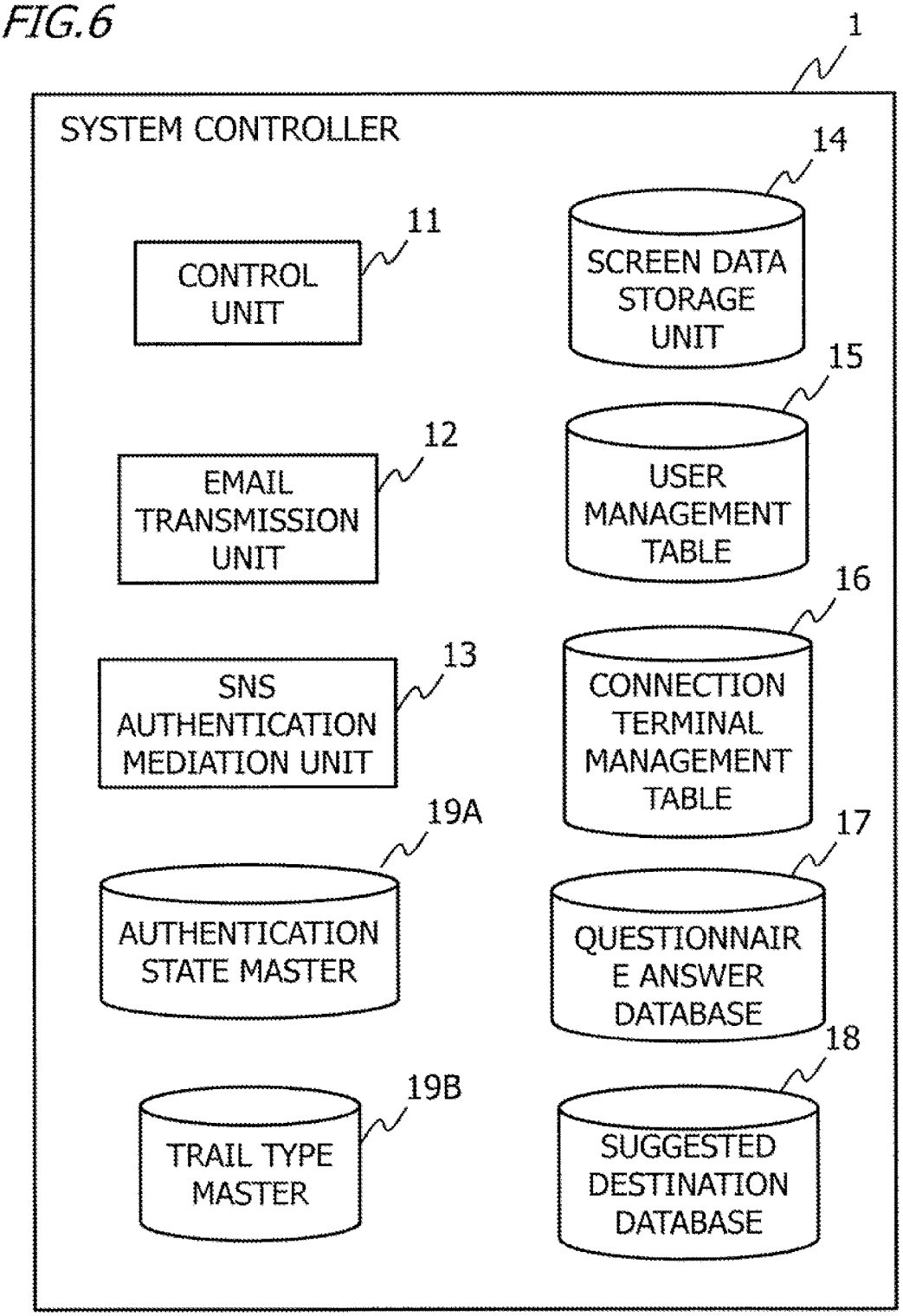
FIG. 6 is a diagram illustrating an example of functional elements of the system controller.

FIG. 6 is a diagram illustrating an example of functional elements of the system controller 1. As the functional elements, the system controller 1 includes a control unit 11, an email transmission unit 12, an SNS authentication mediation unit 13, a screen data storage unit 14, a user management table 15, a connection terminal management table 16, a questionnaire answer database 17, a suggested destination database 18, an authentication state master 19A, and a trail type master 19B.

The control unit 11 is a functional element which is achieved by the CPU 101 executing the login control program 105P. When a connection request is received from the mobile terminal 5, the control unit 11 transmits, to the mobile terminal 5, a login screen including a question of a questionnaire and an answer section, and options for the authentication method. When an answer to a questionnaire is obtained from the mobile terminals, the control unit 11 performs a process for permitting communication of the mobile terminal 5 with restrictions. When the mobile terminal 5 is authenticated by one of password authentication and SNS authentication, the control unit 11 lifts the restriction on communication of the mobile terminal 5. Details of the process of the control unit 11 will be given later. The control unit 11 is an example of a "control unit".

The email transmission unit 12 is a functional element which is achieved by the CPU 101 executing an email transmission/reception program stored in the auxiliary memory device 105. The email transmission/reception program is referred to also as mailer software. The email transmission unit 12 transmits an email to a destination email address according to an instruction from the control unit 11.

The SNS authentication mediation unit 13 is a functional element which is achieved by the CPU 101 executing OAuth 2.0 stored in the auxiliary memory device 105, for example. The SNS authentication mediation unit 13 is activated by the control unit 11, and performs a process regarding user authentication for the mobile terminal 5, together with the SNS server 9. In the case where user authentication for the mobile terminal 5 by the SNS server 9 succeeds, the SNS authentication mediation unit 13 receives user attribute information of the mobile terminal 5 from the SNS server 3. The user attribute information includes an SNS account of the user of the mobile terminal 5, for example. The SNS authentication mediation unit 13 outputs the user attribute information to the control unit 11. The control unit 11 detects successful user authentication for the mobile terminal 5 by an SNS, based on the input of the user attribute information.

The screen data storage unit 14, the user management table 15, the connection terminal management table 16, the questionnaire answer database 17, the suggested destination database 18, the authentication state master 19A, and the trail type master 13B are created in the auxiliary memory device 105.

The screen data storage unit 14 stores login screen data. The screen data storage unit 14 may include error notification screen data and suggestion screen data, in addition to the login screen data. The error notification screen is a screen for notifying the mobile terminal 5 of an error when data input to an input section included in the login screen is not sufficient. For example, the error notification screen is the login screen further including an error message "please fill out the _ section", for example. The suggestion screen is a screen that is presented first after authentication of the mobile terminal 5. The suggestion screen includes an URL of a site presenting information according to an answer to a questionnaire, for example.

An answer to a questionnaire transmitted from the mobile terminal 5 is stored in the questionnaire answer database 17. URLs of sites toe presented to the mobile terminal 5 are stored in the suggested destination database 18 on a per-genre basis, for example.

Figure 7:
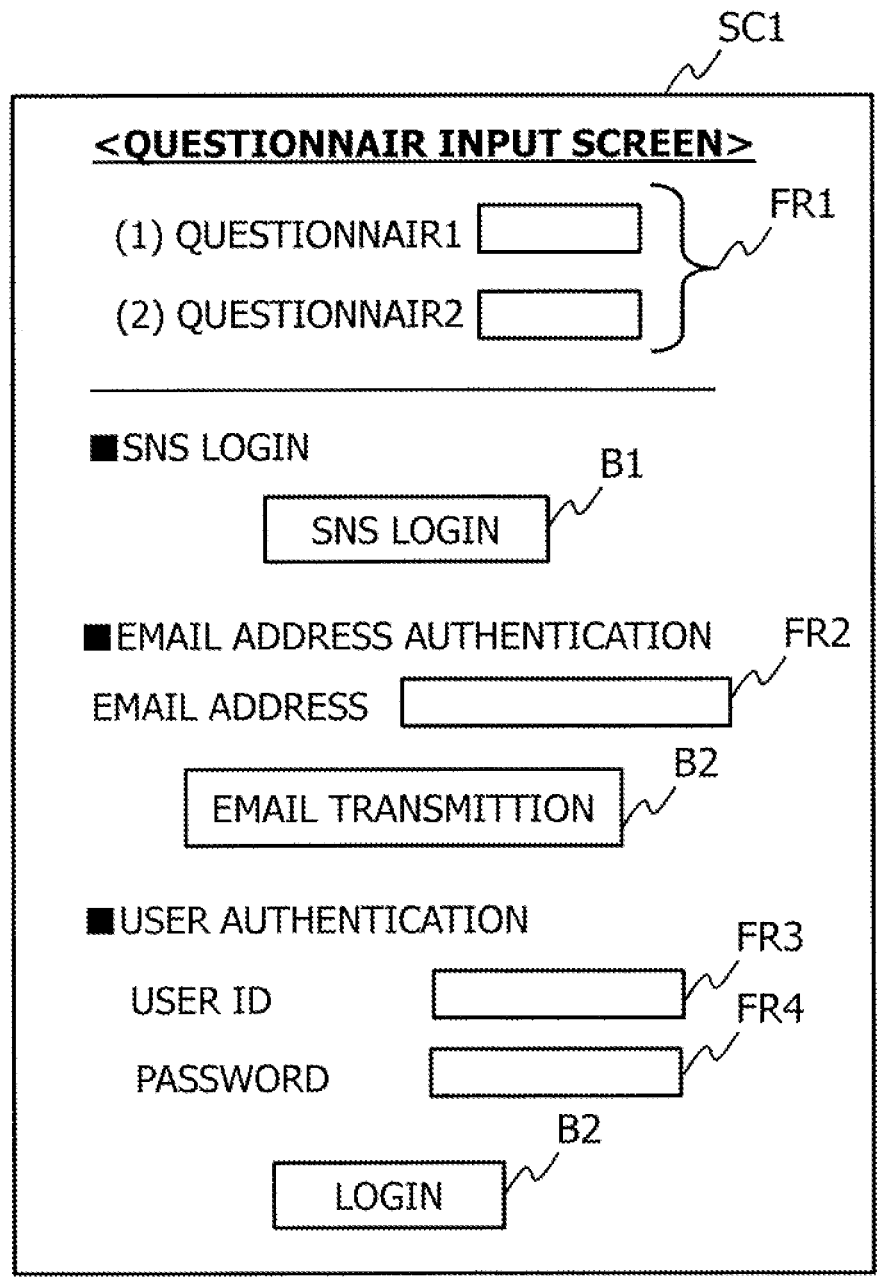
FIG. 7 is a diagram illustrating an example of a login screen.

FIG. 7 is a diagram illustrating an example of the login screen. A login screen SC1 includes an input section FR1 for an answer to a questionnaire, an SNS login button B1, an email address input section FR2, an email transmission button B2, a user ID input section FR3, a password input section FR4, and a login button B3.

When the SNS button B1 is clicked by a user operation, the input content (an answer to a questionnaire) in the input section FR1 for an answer to a questionnaire and a request for user authentication by an SNS are transmitted from the mobile terminal 5 to the system controller 1. When the email transmission button B2 is clicked by a user operation, the input content (an answer to a questionnaire) in the input section FR1 for an answer to a questionnaire and the input content (an email address) in the email address input section FR2 are transmitted from the mobile terminal 5 to the system controller 1.

When the SNS button B1 or the email transmission button B2 is clicked, if there is no input in the input section FR1 for an answer to a questionnaire, an error screen is displayed.

A user ID and a password sent by an email are input in the user ID input section FR3 and the password input section FR4. The input content in the password input section FR4 is hidden for security reasons. The user ID and the password may be changed after initial login by a user operation.

When the login button B3 is clicked by a user operation, the input contents (the user ID, the password) in the user ID input section FR3 and the password input section FR4 are transmitted from the mobile terminal 5 to the system controller 1.

In the case where the login button B3 is clicked, an error is not issued even if there is no input in the input section FR1 for an answer to a questionnaire. This is because a questionnaire is answered before acquisition of the user ID and the password (see FIG. 3A). However, an error screen is displayed if the input contents (the user ID, the password) in the user ID input section FR3 and the password input section FR4 are not correct. Also, when the login button B3 is clicked, if an answer is input in the input section FR1 for an answer to a questionnaire, the answer to a questionnaire may be transmitted to the system controller 1, together with the user ID and the password. The login screen illustrated in FIG. 7 is an example of a "login screen including an input section for an answer to a questionnaire".

FIG. 8 is a diagram illustrating an example of information that is stored as one record in the user management table 15. The user management table 15 is information about a user who uses the wireless communication system 100. In the user management table 15, one record is created for one user. Additionally, in the first embodiment, one user ID or SNS account is assumed toe one user.

A user management ID, an IP address, a trail type ID, trail information, temporary authentication information, a user ID, a password, a restricted authentication start time, a restricted authentication end time, the number of times of restricted authentication connection, a last use date/time, and the number of times of use are stored as one record in the user management table 15.

The user management ID is identification information of a user in the system controller 1. The user management ID is created by the control unit 11. The IP address is updated every time authentication of a user of the user management ID is performed.

A code indicating an authentication method is stored as the trail type ID. The content indicated by the code of the trail type ID is defined by referring to the trail type master 19B.

Trail information that is registered in the authentication server 4 is stored as the trail information. The trail information is information used by the wireless communication system 100 for user authentication. In the case of password authentication, an email address is stored as the trail information. In the case of user authentication by an SNS, an SNS account name is stored as the trail information. However, the trail information is not limited to an email address or an account name. The temporary authentication information is authentication information that is temporarily issued for restricted authentication, and is registered in the authentication server 4. In the case of password authentication, the temporary authentication information is an email address sent from the mobile terminal 5. In the case of SNS authentication, the temporary authentication information is a user account that is automatically created by the control unit 11. However, the temporary authentication information is not limited to those mentioned above.

The user ID and the password are the user ID and the password used for password authentication. Initial values of the user ID and the password are created by the control unit 11. The user ID and the password may be changed by a user operation.

The restricted authentication start time and the restricted authentication end time are the start time and the end time of restricted authentication of the mobile terminal 5. The number of times of restricted authentication connection is the number of times restricted authentication is performed a day. An upper limit is set to the number of times restricted authentication is performed a day. This is a measure taken so as not to permit communication of the mobile terminal 5 in a case where password authentication is selected and the email sent from the mobile terminal 5 is fraudulent, for example. The initial value of the number of times of restricted authentication connection is zero. The number of times of restricted authentication connection is reset when the date changes.

The last use date/time is the time of last login by the mobile terminal 5 of a user identified by the user management ID. The number of times of use is the number of times of occurrence of restricted authentication for the mobile terminal 5 of a user identified by the user management ID. The initial value of the number of times of use is zero.

A record in the user management table 15 is identified with the user management ID, the trail type ID, and the trail information as primary keys. Accordingly, the user management ID, the trail type ID, and the trail information are not to be rewritten. Items other than the user management ID, the trail type ID, and the trail information are rewritten when changed, and the record is updated.

FIG. 9 is a diagram illustrating an example of information that is stored as one record in the connection terminal management table 16. The connection terminal management table 16 is information about a terminal that is to connect to the wireless communication system 100. In the connection terminal management table 16, one record is created for one terminal.

For example, trail information, a MAC address, an IP address, an authentication start time, an authentication end time, and an authentication state ID are stored as one record in the connection terminal management table 16. The trail information is the trail information of a user of the mobile terminal 5. Records in the user management table 15 and the connection terminal management table 16 are linked by the trail information.

The MAC address and the IP address are a MAC address and an IP address of the mobile terminal 5. The authentication start time is the time when authentication of the mobile terminal 5 is started. Target authentication of the authentication start time includes restricted authentication.

The authentication end time is the end time of a time period when the mobile terminal 5 is allowed to perform connection without reauthentication even if a session is shut down after authentication is performed once. The authentication end time is determined by adding an authentication maintaining time period to the authentication start time. The authentication maintaining time period is acquired from the trail type master 19B.

The authentication state ID is a code indicating the authentication state of the mobile terminal 5. For example, the authentication state may be unauthenticated, authenticated, or restricted authentication. The authentication state ID is defined by the authentication state master 19A. The authentication state ID is rewritten according to a shift in the authentication state of the mobile terminal 5. The initial value of the authentication state is a code indicating "unauthenticated".

A record in the connection terminal management table 16 is identified with the trail information and the MAC address as primary keys. Accordingly, the trail information and the MAC address are not to be rewritten. Items other than the trail information and the MAC address are rewritten when changed, and the record is updated. Also, when the authentication end time is elapsed, the authentication state ID in the record in the connection terminal management table 16 is updated to a code indicating "unauthenticated".

FIG. 10 is an example of the authentication state master 19A. The authentication state master 19A defines the correspondence between the authentication state ID and the authentication state. For example, in the example illustrated in FIG. 10, it is indicated that, in the case where the authentication state ID is "0", the authentication state is "unauthenticated". In the case where the authentication state ID is "1", the authentication state is indicated toe "authenticated". In the case where the authentication state ID is "2", the authentication state is indicated to be "restricted authentication". However, the correspondence between the authentication state ID and the authentication state illustrated in FIG. 10 is merely an example, and is not restrictive.

FIG. 11 is an example of the trail type master 19B. The trail type master 19B defines the correspondence between the trail type ID and the trail type. In the example illustrated in FIG. 11, the trail type ID, the trail type, the number of simultaneous connections, and the authentication maintaining time period are included in one record in the trail type master 19B.

In the example illustrated in FIG. 11, it is indicated that, in the case where the trail type ID is "0", the trail type is "no authentication". In the case where the trail type ID is "1", the trail type is indicated to be "password authentication". In the case where the trail type ID is "2", the trail type is indicated to be "SNS authentication". However, the correspondence between the trail type ID and the trail type illustrated in FIG. 11 is merely an example, and is not restrictive.

The number of simultaneous connections is the upper limit of the number of terminals allowed toe connected under the same user ID. In the case of password authentication, a user ID and a password registered in the user management table 15 may be shared by a plurality of terminals, and the plurality of terminals are allowed to connect to the wireless communication system 100. In the case of SNS authentication, if login by a plurality of terminals with the same account is permitted by the SNS system, the plurality of terminals may connect to the wireless communication system 100.

The authentication maintaining time period is the time length during which the mobile terminal 5 which is authenticated may connect to the wireless communication system 100 without being reauthenticated. During the time from authentication and lapse of the authentication maintaining time period, even if the session of the mobile terminal 5 is shut down, the mobile terminal 5 is allowed to connect to the wireless communication system 100 without being reauthenticated.

Flow of Process

Figure 12A:
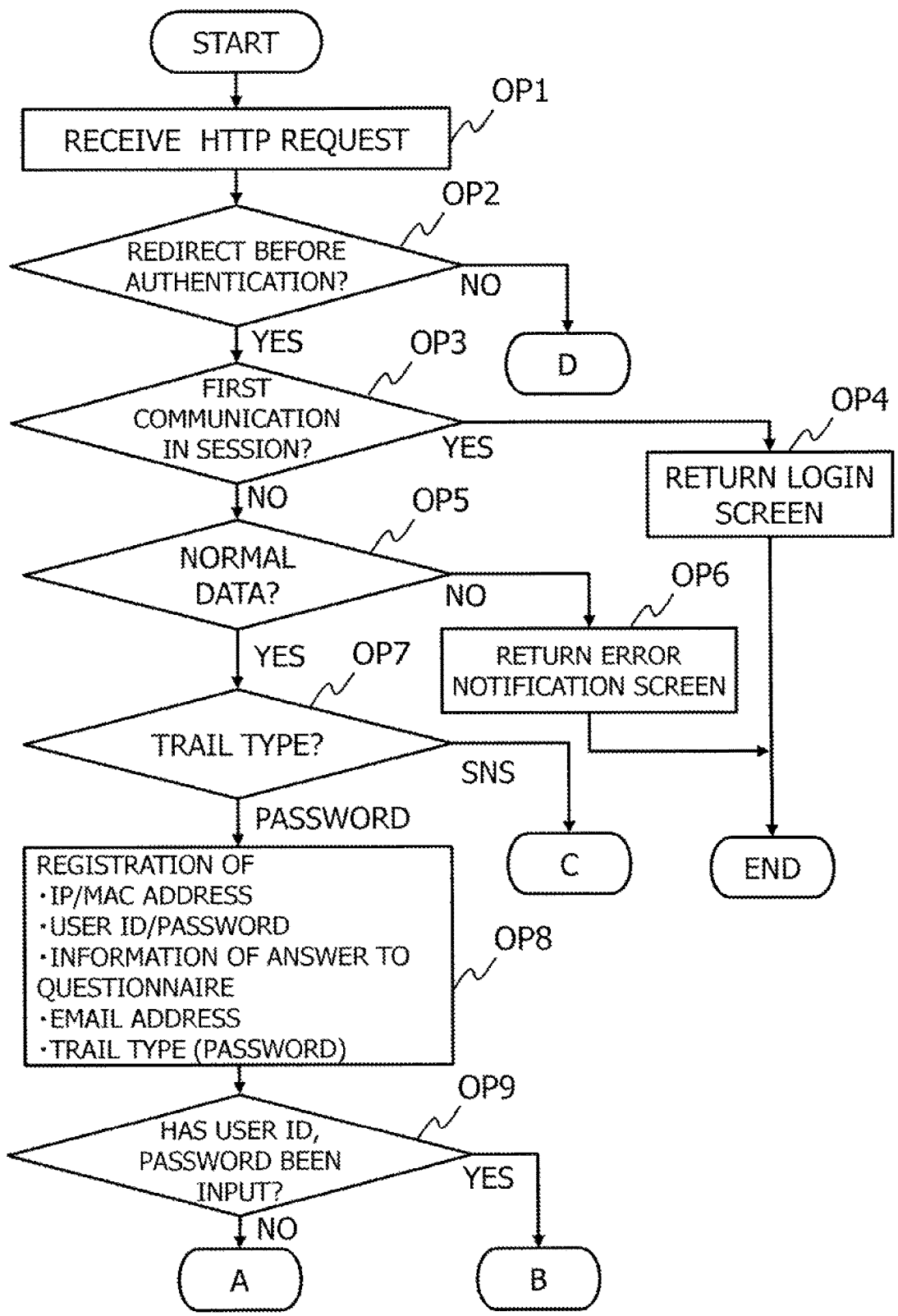
FIG. 12A is an example of a flow chart of a process of the system controller in a case where a browser access is received from a user.
Figure 12B:
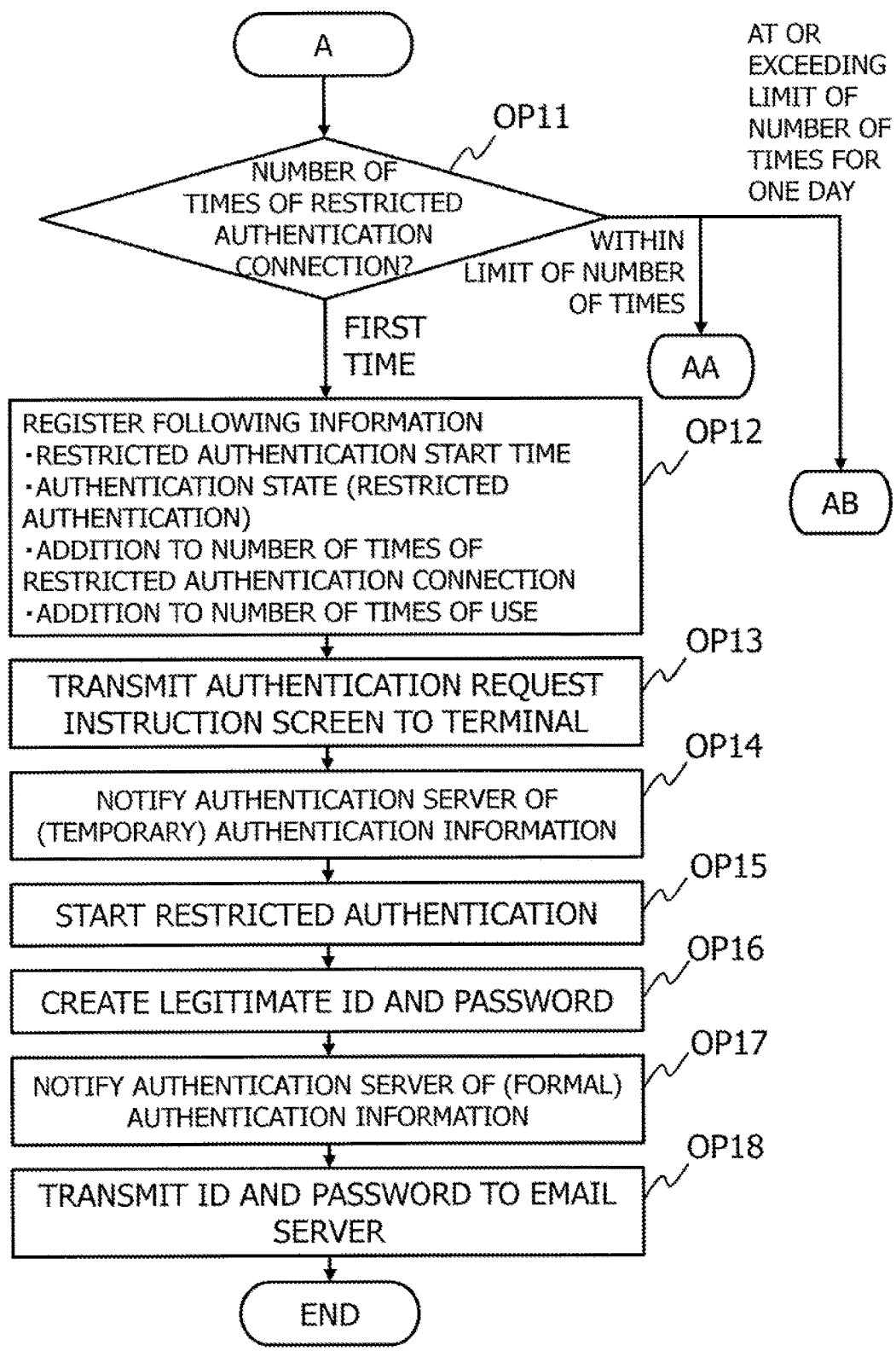
FIG. 12B is an example of the flow chart of the process of the system controller for a case where a browser access is received from a user.
Figure 12B:
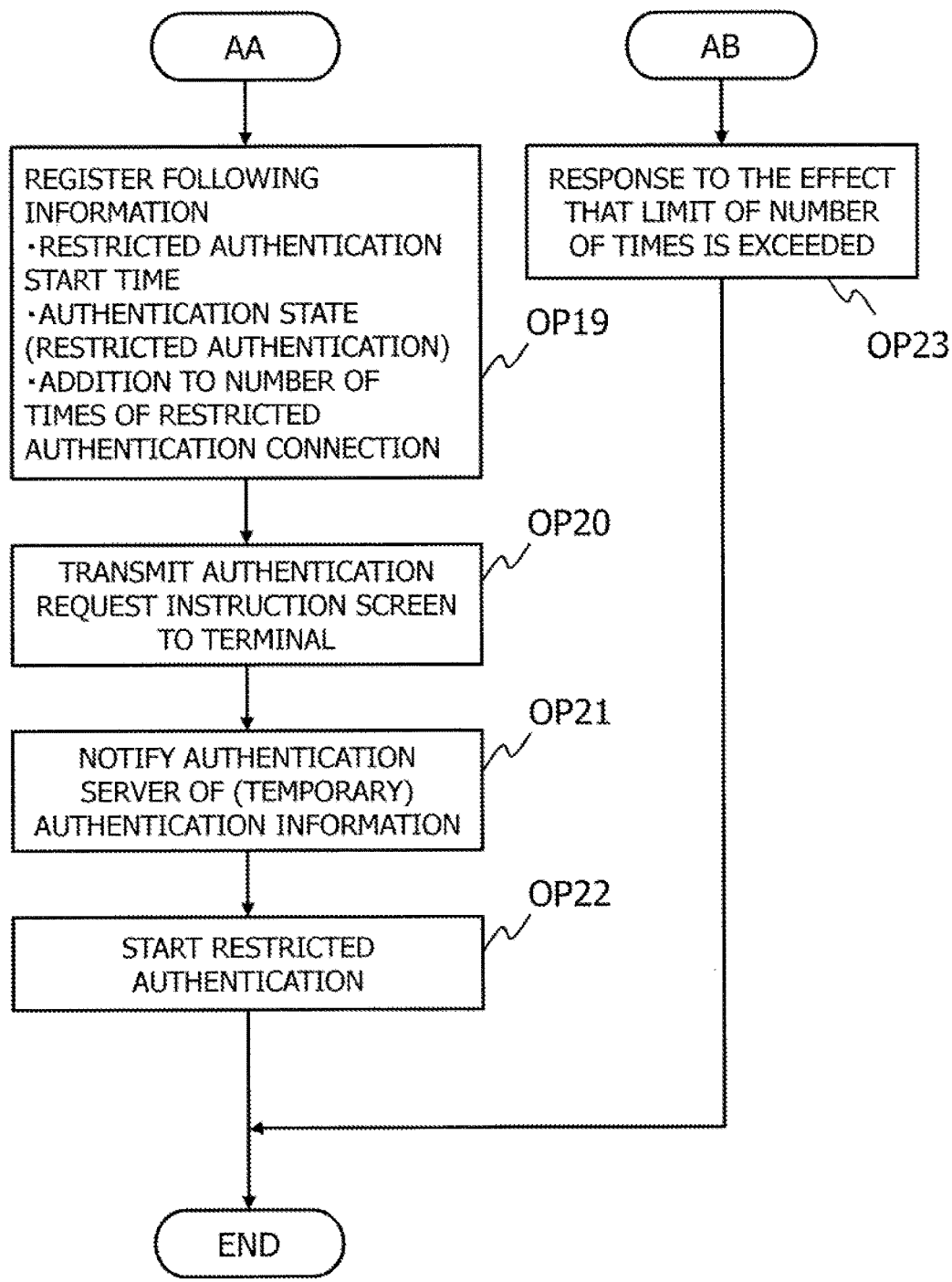

FIGS. 12A, 12B, 12BA, 12C, 12D, 12DA, 12E, and 12F are an example of a flow chart of a process of the system controller 1 in a case where a browser access is received from a user. Browser access from a user is performed by using HTTP (Hypertext Transfer Protocol). The process illustrated in FIG. 12A is started when the system controller 1 receives an HTTP request from the mobile terminal 5. Additionally, the process illustrated in FIGS. 12A to 12F is mainly performed by the CPU 101 executing the login control program 105P, but description will be given assuming that the process is performed by the control unit 11, which is a functional element, for the sake of convenience.

In OP1, the control unit 11 receives an HTTP request. The HTTP request is an example of a "connection request". In OP2, the control unit 11 determines whether the received HTTP request was redirected before authentication or after authentication.

In the first embodiment, the wireless LAN controller 2 performs an operation of redirecting an HTTP request before authentication and the first HTTP request after authentication to the system controller 1. In the case of an HTTP request before authentication, the wireless LAN controller 2 specifies the URL of a login screen as a redirect destination. In the case of the first HTTP request after authentication, the wireless LAN controller 2 redirects the HTTP request to the system controller 1 as a proxy regardless of the connection destination URL included in the HTTP request.

For this purpose, the control unit 11 determines, based on the connection destination URL of the HTTP request, whether the HTTP request was redirected before authentication or after authentication. In the case where the received HTTP request was redirected before authentication (OP2: YES), the process proceeds to OP3. If the received HTTP request was redirected after authentication (OP2: NO), the process proceeds to OP51 in FIG. 12E.

In OP3, the control unit 11 determines whether the session of the received HTTP request is the first communication or not. This determination is performed based on a body part of the HTTP request. For example, if the session of the received HTTP request is the first communication, the HTTP request does not include a body part. For example, if the session of the received HTTP request is communication after the first communication, the HTTP request includes a body part.

In the case where the session of the received HTTP request is the first communication (OP3: YES), the process proceeds to OP4. If the session of the received HTTP request is not the first communication (OP3: NO), the process proceeds to OP5.

In OP4, because the session of the received HTTP request is the first communication, the control unit 11 transmits the login screen. Additionally, the connection destination of the HTTP request is made the login screen due to being redirected by the wireless LAN controller 2. Then, the process illustrated in FIG. 12A is ended.

In OP5, the control unit 11 determines whether data included in the body part of the received HTTP request is normal or not. An input content in the login screen is contained in the body part of the HTTP request, received by the system controller 1 before authentication of the mobile terminal 5, after the first communication. Accordingly, in OP5, the control unit 11 determines whether the input content in the login screen from the mobile terminal 5 is sufficient or not.

For example, in the case where none of information indicating use of SNS authentication, an email address, a user ID, and a password is contained in the body part of the HTTP request, the control unit 11 determines that input data is insufficient. Also, for example, in the case where information indicating use of SNS authentication or an email address is contained in the body part of the HTTP request but an answer to a questionnaire is not, the control unit 11 determines that the input data is insufficient.

In the case where the data contained in the body part of the received HTTP request is normal (OP5: YES), that is, in the case where the input content in the login screen is sufficient, the process proceeds to OP7. In the case where the data contained in the body part of the received HTTP request is not normal (OP5: NO), that is, in the case where the input content in the login screen is insufficient, the process proceeds to OP6.

In OP6, because the input content in the login screen is insufficient, the control unit 11 transmits an error notification screen stored in the screen data storage unit 14 to the mobile terminal 5. Then, the process illustrated in FIG. 12A is ended.

In OP7, the control unit 11 determines the trail type. For example, if the body part of the received HTTP request contains an email address, or a user ID and a password, the control unit 11 determines that the trail type is password authentication. For example, in the case where the body part of the received HTTP request contains information indicating use of SNS authentication, the control unit 11 determines that the trail type is SNS authentication.

In the case where the trail type is password authentication (OP7: password), the process proceeds to OP8. If the trail type is SMS authentication (OP7: SNS), the process proceeds to OP41 in FIG. 12D.

In OP8, the control unit 11 registers information acquired from the HTTP request in the user management table 15 and the connection terminal management table 16. If there is no corresponding record in the user management table 15 and the connection terminal management table 16, the control unit 11 creates the record. The process for creating a record is as described below.

The control unit 11 stores a created value in the "user management ID" in the user management table 15. The control unit 11 stores a source IP address of the HTTP request in the "IP address" in the user management table 15. The control unit 11 stores the code "1" indicating the trail type (password) determined in OP7 in the "trail type ID" in the user management table 15. In the case where an email address is included in the received HTTP request, the control unit 11 stores the email address in the "trail information" in the user management table 15 and the "trail information" in the connection terminal management table 16. The control unit 11 stores a MAC address and the IP address of the source of the HTTP request in the "MAC address" and the "IP address" in the connection terminal management table 16. The control unit 11 stores the code "0" indicating "unauthenticated", which is the initial state, in the "authentication state ID" in the connection terminal management table 16.

Additionally, in OP8, if corresponding records are already in the user management table 15 and the connection terminal management table 16, the user management table 15 and the connection terminal management table 16 are not updated in OP 8.

In OP9, the control unit 11 determines whether a user ID and a password are included in the received HTTP request or not. If a user ID and a password are included in the received HTTP request (OP9: YES), the process proceeds to OP31 in FIG. 12C. If a user ID and a password are not included in the received HTTP request (OP9: NO), that is, if an email address is included in the HTTP request, the process proceeds to OP11 in FIG. 12B.

The process illustrated in FIGS. 12B and 12BA is a process for a case where an email address is contained in the body part of the HTTP request. In OP11, the control unit 11 refers to the number of times of restricted authentication connection in the corresponding record in the user management table 15, and determines which time in the order this time of restricted authentication is on the day in question.

In the case of first restricted authentication on the day (OP11: first time), that is, in the case where the number of times of restricted authentication connection in the record in the user management table 15 is zero, the process proceeds to OP12. In the case of restricted authentication within a limit of the number of times for the day (OP11: within the limit of the number of times), that is, in the case where the number of times of restricted authentication connection in the record in the user management table 15 is within the limit of the number of times, the process proceeds to OP19 in FIG. 12BA. In the case where the number of times of restricted authentication is exceeding the limit of the number of times for the day (OP11: at or exceeding the limit of the number of times for one day), that is, in the case where the number of times of restricted authentication connection in the record in the user management table 15 is at or exceeding the limit of the number of times, the process proceeds to OP23 in FIG. 12BA. Additionally, the limit of the number of times of restricted authentication for one day is set in advance.

OP12 to OP18 is a process for a case of the first restricted authentication in a day. In OP12, the control unit 11 sets the current time in the "restricted authentication start time" in the corresponding record in the user management table 15, and in the "authentication start time" in the corresponding record in the connection terminal management table 16. The control unit 11 adds one to each of the "number of times of restricted authentication connection" and the "number of times of use" in the record in the user management table 15. The control unit 11 sets "2" indicating "restricted authentication" in the "authentication state ID" in the record in the connection terminal management table 16. Also, the control unit 11 sets a value obtained by adding the authentication maintaining time period to the authentication start time in the "authentication end time" in the record in the connection terminal management table 16.

In OP13, the control unit 11 transmits an authentication request instruction screen to the mobile terminal 5. The authentication request instruction screen is a screen including an instruction for the mobile terminal 5 to request the wireless LAN controller 2 for authentication. Also, an instruction to use an email address as authentication information is included in the authentication request instruction screen transmitted in OP13. When the authentication request instruction screen is received, the mobile terminal 5 transmits an authentication request including an email address as authentication information to the wireless LAN controller 2.

The authentication request instruction screen is an example of an "instruction for transmission of an authentication request".

In OP14, the control unit 11 transmits the email address included in the HTTP request, as temporary authentication information, to the authentication server 4. The control unit 11 stores the email address included in the HTTP request in the "temporary authentication information" in the record in the user management table 15.

In OP15, the control unit 11 starts a timer for restricted authentication. This is because, in the first embodiment, the "restriction" on the restricted authentication is a time restriction. The timer is set to an arbitrary value between 3 minutes to 30 minutes, for example.

In OP16, the control unit 11 creates legitimate user ID and password. The control unit 11 stores the user ID and the password which have been created in the "user ID" and the "password" in the record in the user management table 15.

In OP17, the control unit 11 transmits, to the authentication server 4, the user ID and the password created in OP16 as formal authentication information. In OP18, the control unit 11 activates the email transmission unit 12, and instructs that an authentication information notification email including the user ID and the password created in OP16 be transmitted to the email server 8. The email transmission unit 12 creates the authentication information notification email including the user ID and the password, sets the email address included in the HTTP request as the destination, and transmits the authentication information notification email to the email server 8. Then, the process illustrated in FIG. 12B is ended.

The process from OP19 to OP22 in FIG. 12BA is a process for a case where the number of times of execution of restricted authentication on the day is two or more and less than the limit of the number of times. In OP19, the control unit 11 sets the current time in the "restricted authentication start time" in the corresponding record in the user management table 15 and the "authentication start time" in the corresponding record in the connection terminal management table 16. The control unit 11 adds one to the "number of times of restricted authentication connection" in the record in the user management table 15. The control unit 11 sets "2" indicating "restricted authentication" in the "authentication state ID" in the record in the connection terminal management table 16. Also, the control unit 11 sets a value obtained by adding the authentication maintaining time period to the authentication start time in the "authentication end time" in the record in the connection terminal management table 16.

In OP20, the control unit 11 transmits the authentication request, instruction screen to the mobile terminal 5. An instruction to use the email address as the authentication information is included in the authentication request instruction screen transmitted in OP20.

In OP21, the email address included in the HTTP request is transmitted to the authentication server 4 as temporary authentication information. This is because the temporary authentication information is deleted from the authentication server 4 by the control unit 11 at the time of expiration of the time for restricted authentication (described later), and at the time point of OP21, the temporary authentication information of the mobile terminal 5 is not registered in the authentication server 4. At the time point of OP21, issuance of legitimate user ID and password to the mobile terminal 5 and registration of the same in the authentication server 4, and transmission of the authentication information notification email to the mobile terminal 5 have already been performed, and therefore they are not performed. In OP22, the control unit 11 starts the timer for restricted authentication. Then, the process illustrated in FIG. 12BA is ended.

The process in OP23 is a process for a case where the number of times of execution of restricted authentication on the day is at or exceeding the limit of the number of times. In OP23, the control unit 11 transmits to the mobile terminal 5 an HTTP response including a message that the limit of the number of times is exceeded. Then, the process illustrated in FIG. 12BA is ended.

Figure 12C:
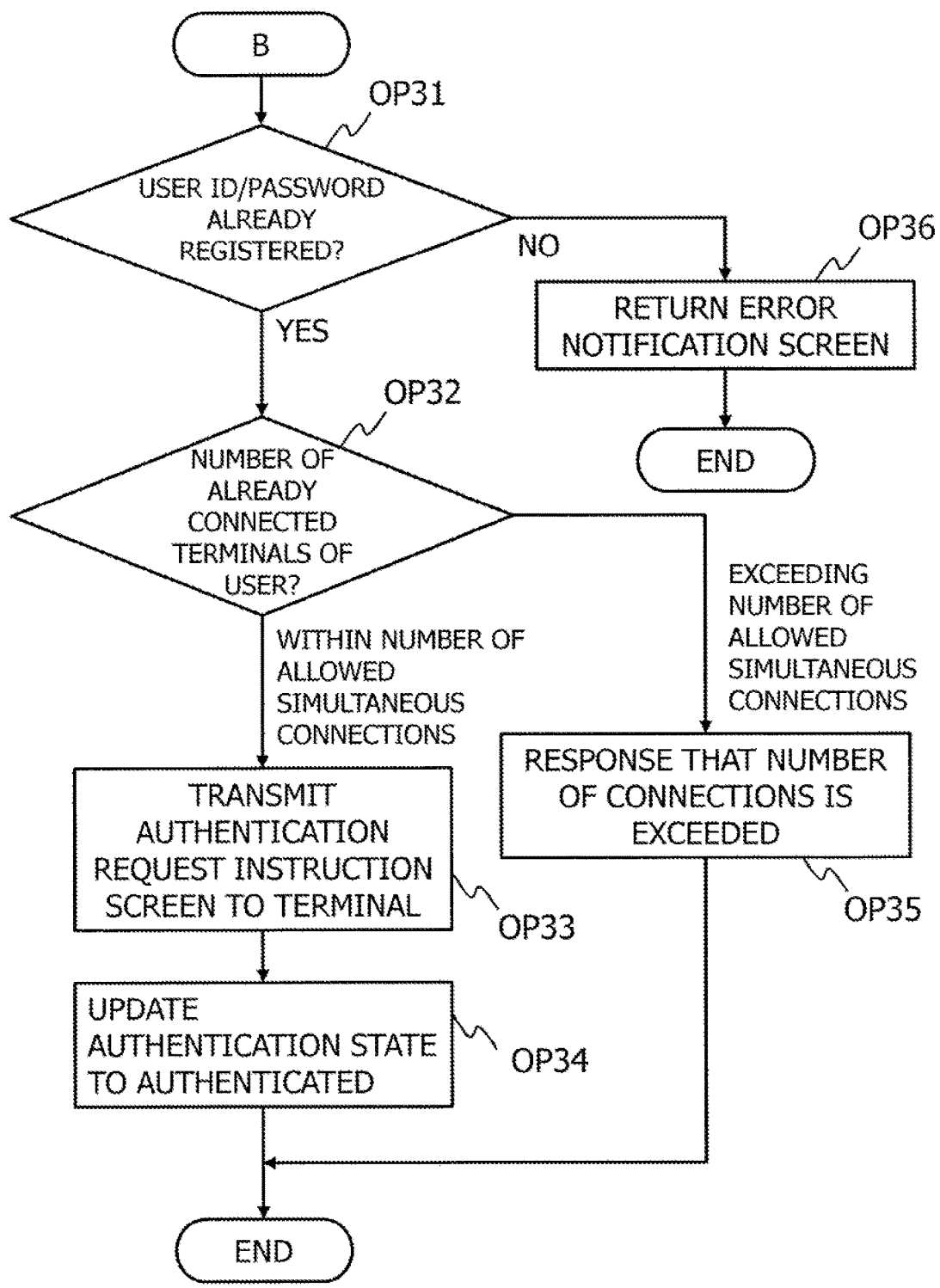
FIG. 12C is an example of the flow chart of the process of the system controller for a case where a browser access is received from a user.

The process illustrated in FIG. 12C is a process for a case where a user ID and a password are contained in the body part of the received HTTP request. In OP31, the control unit 11 determines whether the user ID and the password included in the HTTP request are registered in the user management table 15 or not. The control unit 11 searches through all the records in the user management table 15 with the user ID and the password included in the HTTP request as keys.

In the case where the user ID and the password included in the HTTP request are registered in the user management table 15 (OP31: YES), the process proceeds to OP32. In the case where the user ID and the password included in the HTTP request are not registered in the user management table 15 (OP31: NO), the process proceeds to OP36.

In OP32, the control unit 11 determines the number of already connected terminals of the user. More specifically, the control unit 11 searches through all the records in the connection terminal management table 16 with the value in the "trail information" for the entry, in the user management table 15, of the same user ID and password as those included in the HTTP request as a key. Next, of the detected records in the connection terminal management table 16, the control unit 11 counts the number of records with different MAC addresses from that of the mobile terminal 5 as the number of already connected terminals of the user.

In the case where the number of already connected terminals of the user is less than the number of allowed simultaneous connections (OP32: within the number of allowed simultaneous connections), the process proceeds to OP33. In the case where the number of already connected terminals of the user exceeds the number of allowed simultaneous connections (OP32: exceeding the number of allowed simultaneous connections), the process proceeds to OP35.

The process in OP33 and OP34 is a process for a case where the number of already connected terminals of the user is less than the number of allowed simultaneous connections. In OP33, the control unit 11 transmits an authentication request instruction screen to the mobile terminal 5. The authentication request instruction screen is a screen including an instruction for the mobile terminal 5 to request the wireless LAN controller 2 for authentication. When the authentication request instruction screen is received, the mobile terminal 5 transmits, to the wireless LAN controller 2, an authentication request including the user ID and the password sent to the system controller 1.

In OP34, the control unit 11 updates the value in the "authentication state ID" of the record, in the connection terminal management table 16, corresponding to the mobile terminal 5 to "2" indicating "authenticated". Then, the process illustrated in FIG. 12C is ended.

The process in OP35 is a process for a case where the number of already connected terminals of the user exceeds the number of allowed simultaneous connections. In OP35, the control unit 11 transmits, to the mobile terminal 5, an HTTP response including a message that the number of connections is exceeded. Then, the process illustrated in FIG. 12C is ended.

The process in OP36 is a process for a case where the user ID and the password included in the HTTP request are not registered in the user management table 15. In OP36, the control unit 11 transmits the error notification screen stored in the screen data storage unit 14 to the mobile terminal 5. Then, the process illustrated in FIG. 12C is ended.

Figure 12D:
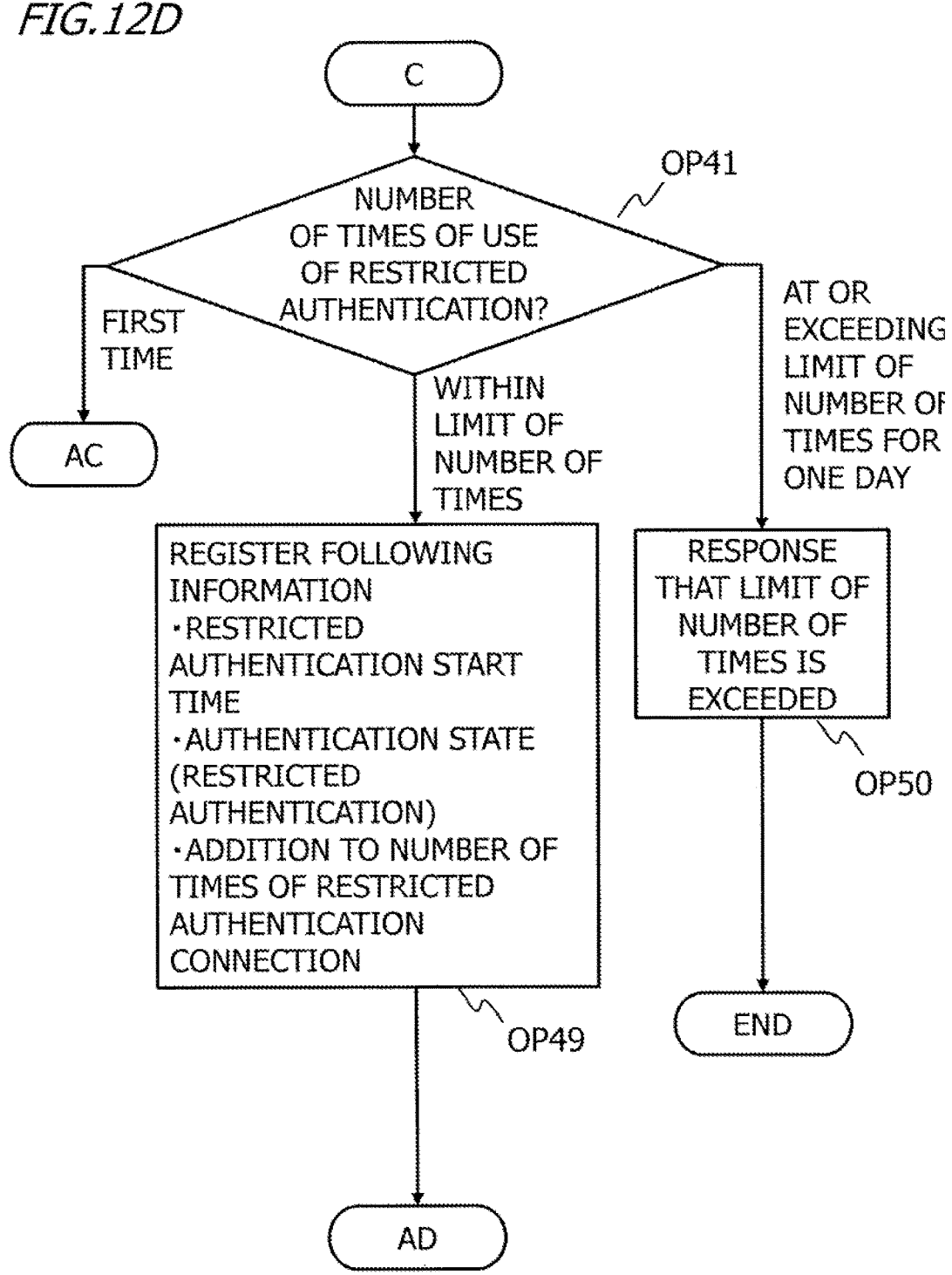
FIG. 12D is an example of the flow chart of the process of the system controller for a case where a browser access is received from a user.
Figure 12D:
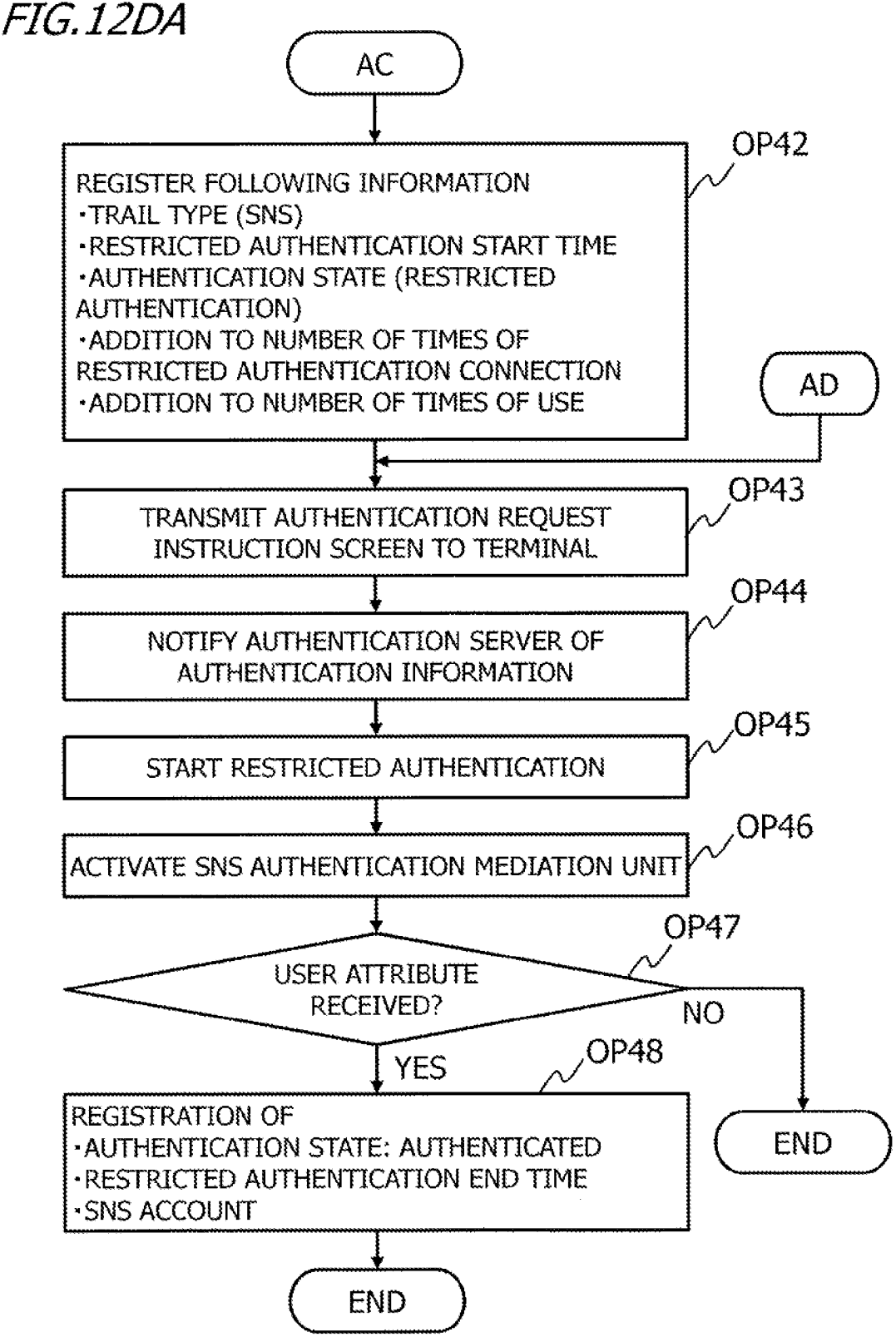

The process illustrated in FIGS. 12D and 12DA is a process for a case where information indicating use of SNS authentication is contained in the body part of the HTTP request. In OP41, in the case where the corresponding record is in the user management table 15, the control unit 11 refers to the number of times of restricted authentication connection in the record, and determines which time in the order this time of restricted authentication is on the day.

In the case of first restricted authentication on the day (OP41: first time), that is, in the case where the number of times of restricted authentication connection in the record in the user management table 15 is zero, or in the case where there is no corresponding record, the process proceeds to OP42 in FIG. 12DA. In the case of restricted authentication within a limit of the number of times for the day (OP41: within the limit of the number of times), that is, in the case where the number of times of restricted authentication connection in the record in the user management table 15 is within the limit of the number of times, the process proceeds to OP49. In the case where the number of times of restricted authentication is exceeding the limit of the number of times for the day (OP41: at or exceeding the limit of the number of times for one day), that is, in the case where the number of times of restricted authentication connection in the record in the user management table 15 is at or exceeding the limit of the number of times, the process proceeds to OP50.

The process from OP42 to OP48 in FIG. 12DA is a process for a case of first restricted authentication on a day. In OP42, if there is no corresponding record in the user management table 15, the control unit 11 creates a record. The method for creating a record is as described below.

The control unit 11 stores a created value in the "user management ID" in the user management table 15. The control unit 11 stores the source IP address of the HTTP request in the "IP address" in the user management table 15. The control unit 11 stores the code "2" indicating the trail type (SNS) determined in OP7 in the "trail type ID" in the user management table 15. The control unit 11 stores the MAC address and the IP address of the transmission source of the HTTP request in the "MAC address" and the "IP address" in the connection terminal management table 16. The control unit 11 stores the code "0" indicating "unauthenticated", which is the initial state, in the "authentication state ID" in the terminal connection management table 16.

Additionally, the following process is performed both when the corresponding records are already in the user management table 15 and the connection terminal management table 16, and when the records are newly created.

The control unit 11 sets the current time in the "restricted authentication start time" in the corresponding record in the user management table 15, and in the "authentication start time" in the corresponding record in the connection terminal management table 16. The control unit 11 adds one to each of the "number of times of restricted authentication connection" and the "number of times of use" in the record in the user management table 15. The control unit 11 sets "2" indicating "restricted authentication" in the "authentication state ID" in the record in the connection terminal management table 16. Also, the control unit 11 sets a value obtained by adding the authentication maintaining time period to the authentication start time in the "authentication end time" in the record in the connection terminal management table 16.

In OP43, the control unit 11 transmits an authentication request instruction screen to the mobile terminal 5. The authentication request instruction screen that is transmitted in OP43 includes a temporary account name created by the control unit 11 as the authentication information, and an instruction to use the temporary account name. When the authentication request instruction screen is received, the mobile terminal 5 transmits an authentication request including the temporary account name as the authentication information to the wireless LAN controller 2.

In OP44, the control unit 11 transmits created temporary authentication information to the authentication server 4. For example, the temporary authentication information is an account name. However, this is not restrictive. The control unit 11 stores the created temporary authentication information in the "temporary authentication information" in the record in the user management table 15. The temporary authentication information the authentication server 4 is notified of in OP44 is the same as the temporary account name included in the authentication request instruction screen in OP43. In OP45, the control unit 11 starts the timer for restricted authentication.

In OP46, the control unit 11 activates the SMS authentication mediation unit 13. A process regarding user authentication for the mobile terminal 5 is performed with the SNS server 9 by the SNS authentication mediation unit 13.

In OP47, the control unit 11 waits for input of user attribute information from the SNS authentication mediation unit 13, The user attribute information is information about the user of the mobile terminal 5 sent from the SNS server 9, and includes the account name. When the user attribute information is input by the SNS authentication mediation unit 13 (OP47: YES), the control unit 11 determines end of authentication of the mobile terminal 5, and the process proceeds to OP48. In the case where the user attribute information is not input by the SMS authentication mediation unit 13 even after a lapse of a predetermined time period (OP47: NO), the process illustrated in FIG. 12DA is ended.

In OP48, the control unit 11 sets "1" indicating "authenticated" in the "authentication state ID" in the record in the connection terminal management table 16. The control unit 11 stores the SNS account of the user of the mobile terminal 5 in the "trail information" in the record in the user management table 15. The control unit 11 sets the current time in the "restricted authentication end time" in the record in the user management table 15. Then, the process illustrated in FIG. 12DA is ended.

The process in OP49 is a process for a case where the number of times of execution of restricted authentication on the day is two or more and less than the limit of the number of times. In OP49, control unit 11 sets the current time in the "restricted authentication start, time" in the corresponding record in the user management table 15 and the "authentication start time" in the corresponding record in the connection terminal management table 16. The control unit 11 adds one to the "number of times of restricted authentication connection" in the record in the user management table 15. The control unit 11 sets "2" indicating "restricted authentication" in the "authentication state ID" in the record in the connection terminal management table 16. Also, the control unit 11 sets a value obtained by adding the authentication maintaining time period to the authentication start time in the "authentication end time" in the record in the connection terminal management table 16. Then, the process proceeds to OP43.

The process in OP50 is a process for a case where the number of times of execution of restricted authentication on the day is at or exceeding the limit of the number of times. In OP50, the control unit 11 transmits, to the mobile terminal 5, an HTTP response including a message that the limit of the number of times is exceeded. Then, the process illustrated in FIG. 12D is ended.

Figure 12E:
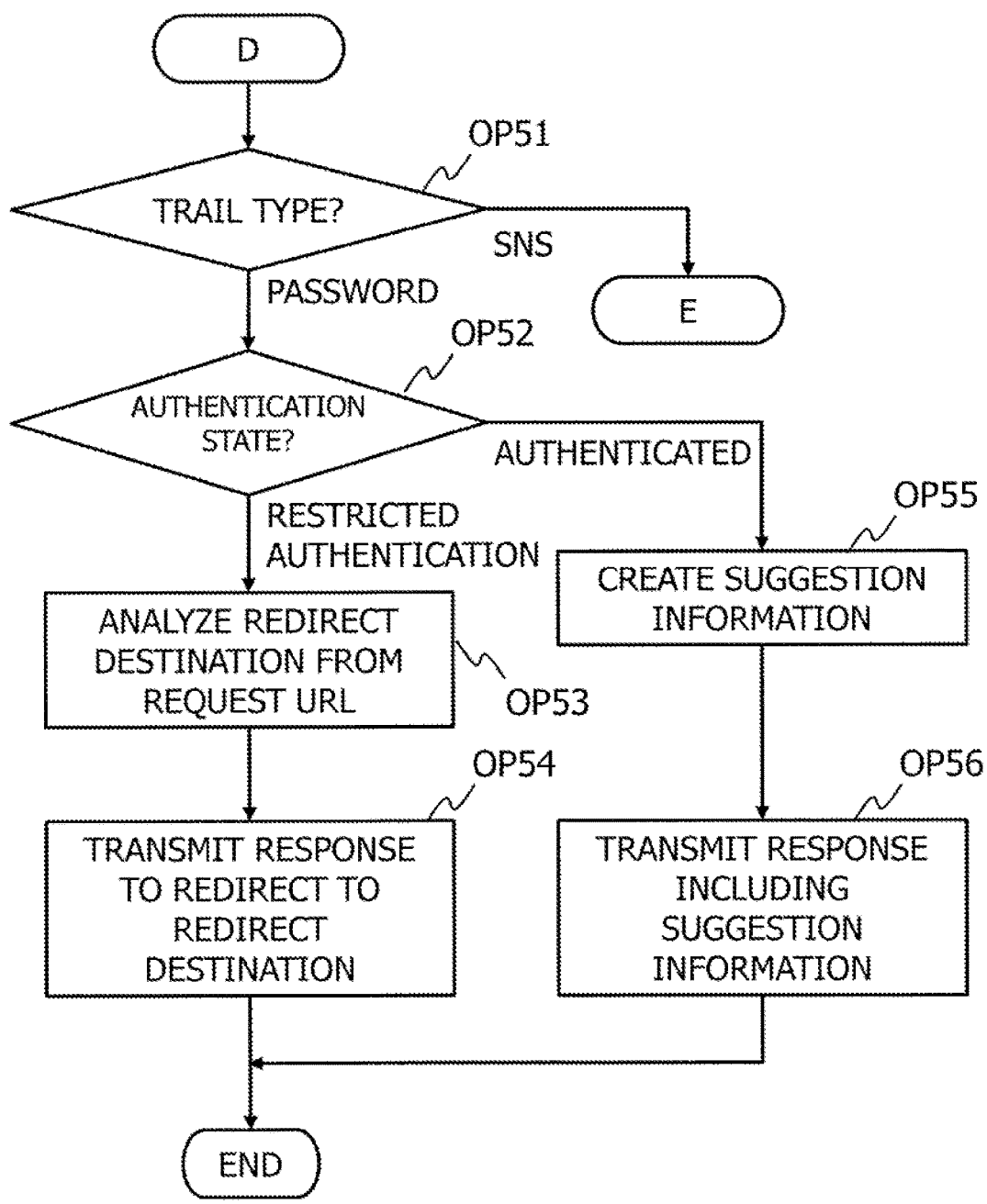
FIG. 12E is an example of the flow chart of the process of the system controller for a case where a browser access is received from a user.

The process illustrated in FIG. 12E is a process for a case where the received HTTP request was redirected after authentication. In OP51, the control unit 11 identifies the trail type of the mobile terminal 5. The control unit 11 acquires the trail information from an entry, in the connection terminal management table 16, corresponding to the source IP address and the MAC address in the HTTP request. The control unit 11 identifies the trail type of the mobile terminal 5 based on the "trail type ID" in the corresponding entry in the user management table 15 including the acquired trail information.

In the case where the trail type of the mobile terminal 5 is password authentication (OP51: password), the process proceeds to OP52. In the case where the trail type of the mobile terminal 5 is SNS authentication (OP51: SNS), the process proceeds to OP61 in FIG. 12F.

The process from OP52 to OP56 is a process for a case where the trail type of the mobile terminal 5 is password authentication. In OP52, the control unit 11 determines the authentication state of the mobile terminal 5. This determination is performed based on the "authentication state ID" in the corresponding entry in the connection terminal management table 16.

In the case where the authentication state of the mobile terminal 5 is "restricted authentication" (OP52: restricted authentication), the process proceeds to OP53. In the case where the authentication state of the mobile terminal 5 is "authenticated" (OP52: authenticated), the process proceeds to OP55.

The process in OP53 and OP54 is a process for a case where the authentication state of the mobile terminal 5 is "restricted authentication". In OP53, the control unit 11 analyzes the redirect destination of redirect, based on a request URL in the HTTP request. In OP54, an HTTP response including the URL obtained as a result of the analysis as the redirect destination is transmitted to the mobile terminal 5. Then, the process illustrated in FIG. 12E is ended.

Figure 12F:
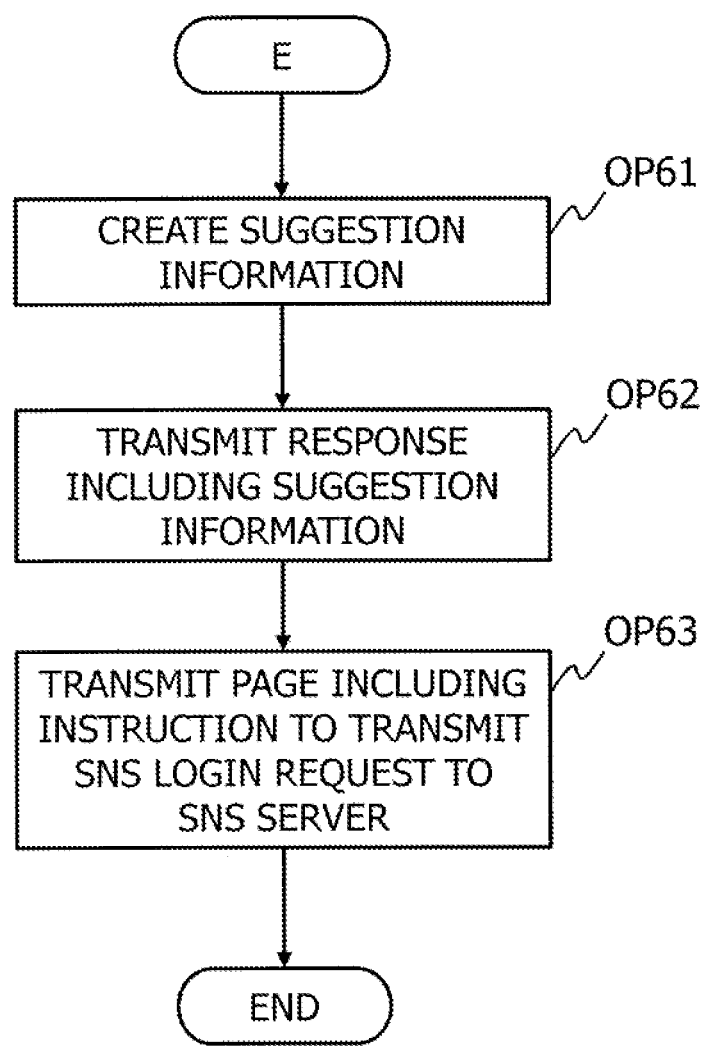
FIG. 12F is an example of the flow chart of the process of the system controller for a case where a browser access is received from a user.

The process in OP55 and OP56 is a process for a case where the authentication state of the mobile terminal 5 is "authenticated". In OP55, the control unit 11 creates suggestion information according to an answer from the user of the mobile terminal 5 to a questionnaire or the number of times of use. The suggestion information may be an URL of a site presenting information of a genre according to the answer to the questionnaire, or screen data of the site presenting information of the genre according to the answer to the questionnaire, for example. In OP56, an HTTP response including the suggestion information is transmitted to the mobile terminal 5. Then, the process illustrated in FIG. 12F is ended. The HTTP response including the suggestion information may include, as the redirect destination, the URL of the site presenting information of the genre according to the answer to the questionnaire, or may include a screen including the URL of the site.

The process illustrated in FIG. 12F is a process for a case where the received HTTP request was redirected after authentication, and the trail type is SNS authentication. Additionally, although details will be described later, in the case where SNS authentication is selected, completion of user authentication by the SNS server 9 is not recognized by the wireless LAN controller 2, and thus, an HTTP request from the mobile terminal 5 does not reach the system controller 1 after completion of authentication. Accordingly, transmission of an HTTP request from the mobile terminal 5 to the system controller 1 is limited toefore completion of authentication.

In OP61, the control unit 11 creates suggestion information according to an answer from the user of the mobile terminal 5 to a questionnaire or the number of times of use. In OP62, the control unit 11 transmits an HTTP response including the suggestion information to the mobile terminal 5. In OP63, a page including an instruction to transmit an SNS login request is transmitted. Then, the process illustrated in FIG. 12F is ended. The HTTP response including the suggestion information may include, as the redirect destination, the URL of a site presenting information of the genre according to the answer to the questionnaire, or may include a screen including the URL of the site.

Additionally, the processes described with reference to FIGS. 12A to 12F are merely examples, and the processes for a case where an HTTP request is received by the system controller 1 are not limited to these examples. For example, the process for information registration in OP8 in FIG. 12A may be performed together with OP12 in FIG. 12B.

Figure 13:
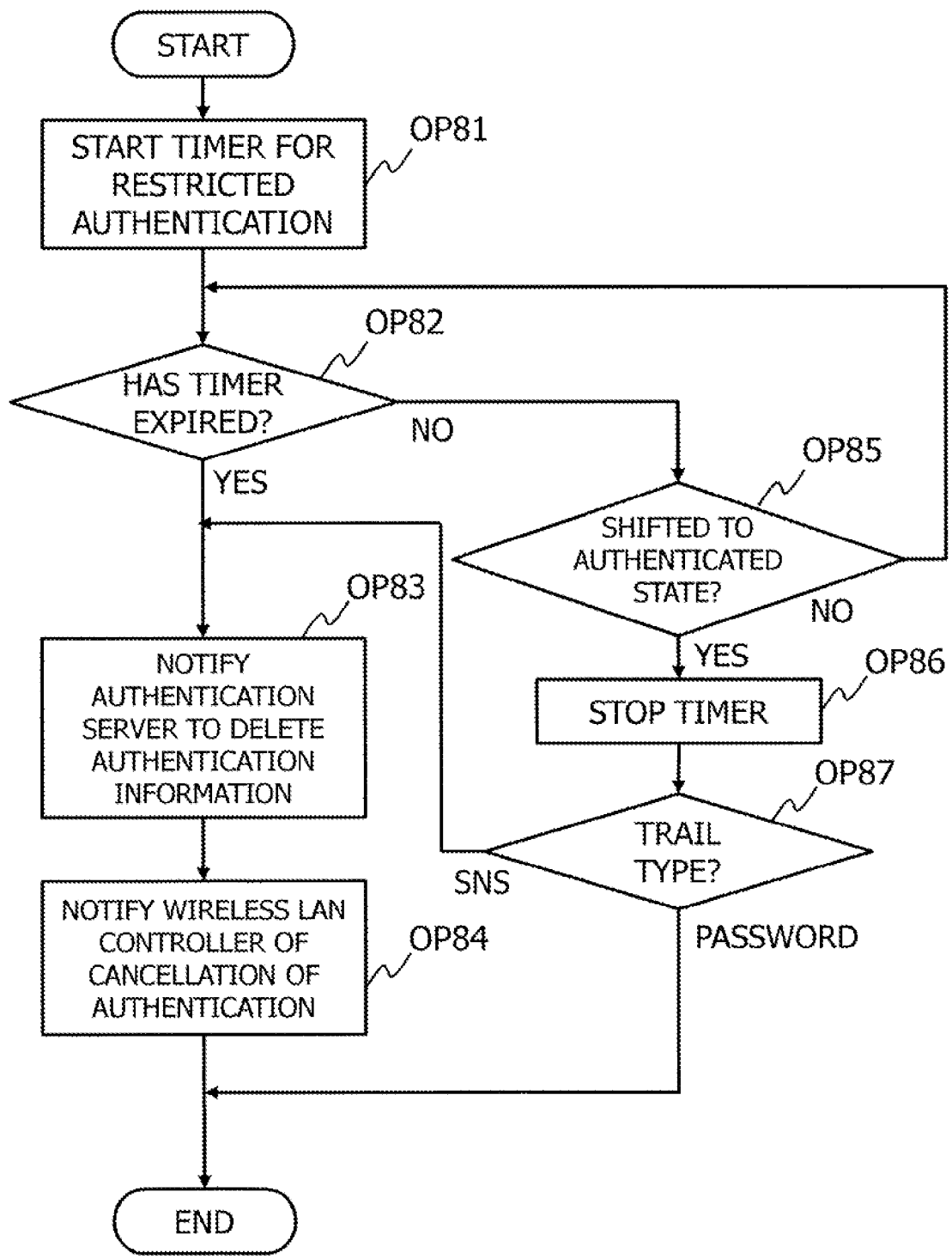
FIG. 13 is an example of a flow chart of a process regarding monitoring of a timer for restricted authentication by the system controller.

FIG. 13 is an example of a flow chart of a process regarding monitoring of a timer for restricted authentication by the system controller 1. The process illustrated in FIG. 13 is started when the timer for restricted authentication is started. Additionally, the process illustrated in FIG. 13 is described to be performed mainly by the control unit 11, which is a functional element, for the sake of convenience.

In OP81, the control unit 11 starts the timer for restricted authentication. In OP82, the control unit 11 determines whether the timer has expired or not. In the case where the timer is not yet expired (OP82: NO), the process proceeds to OP85. In the case where the timer is expired (OP82: YES), the process proceeds to OP83.

In OP83, the control unit 11 transmits, to the authentication server 4, a request for deletion of the temporary authentication information. In OP84, the control unit 11 instructs the wireless LAN controller 2 to cancel authentication of the mobile terminal 5. The timer for restricted authentication is thereby expired, and authentication of the mobile terminal 5 is cancelled and the session of the mobile terminal 5 is shut down. Then, the process illustrated in FIG. 13 is ended.

In OP85, the control unit 11 determines whether the authentication state of the mobile terminal 5 has shifted to "authenticated" or not. The authentication state of the mobile terminal 5 is determined based on the "authentication state ID" in the corresponding entry in the connection terminal management table 16. In the case where the authentication state of the mobile terminal 5 has shifted to "authenticated" (OP85: YES), the process proceeds to OP86. In the case where the authentication state of the mobile terminal 5 is not shifted to "authenticated" (OP85: NO), the process proceeds to OP82.

In OP86, the control unit 11 stops the timer. In OP87, the control unit 11 determines the trail type. In the case where the trail type is password authentication (OP87: password), the process proceeds to OP83. In the case where the trail type is SMS authentication (OP87: SMS), the process illustrated in FIG. 13 is ended.

Specific Example

Figure 14B:
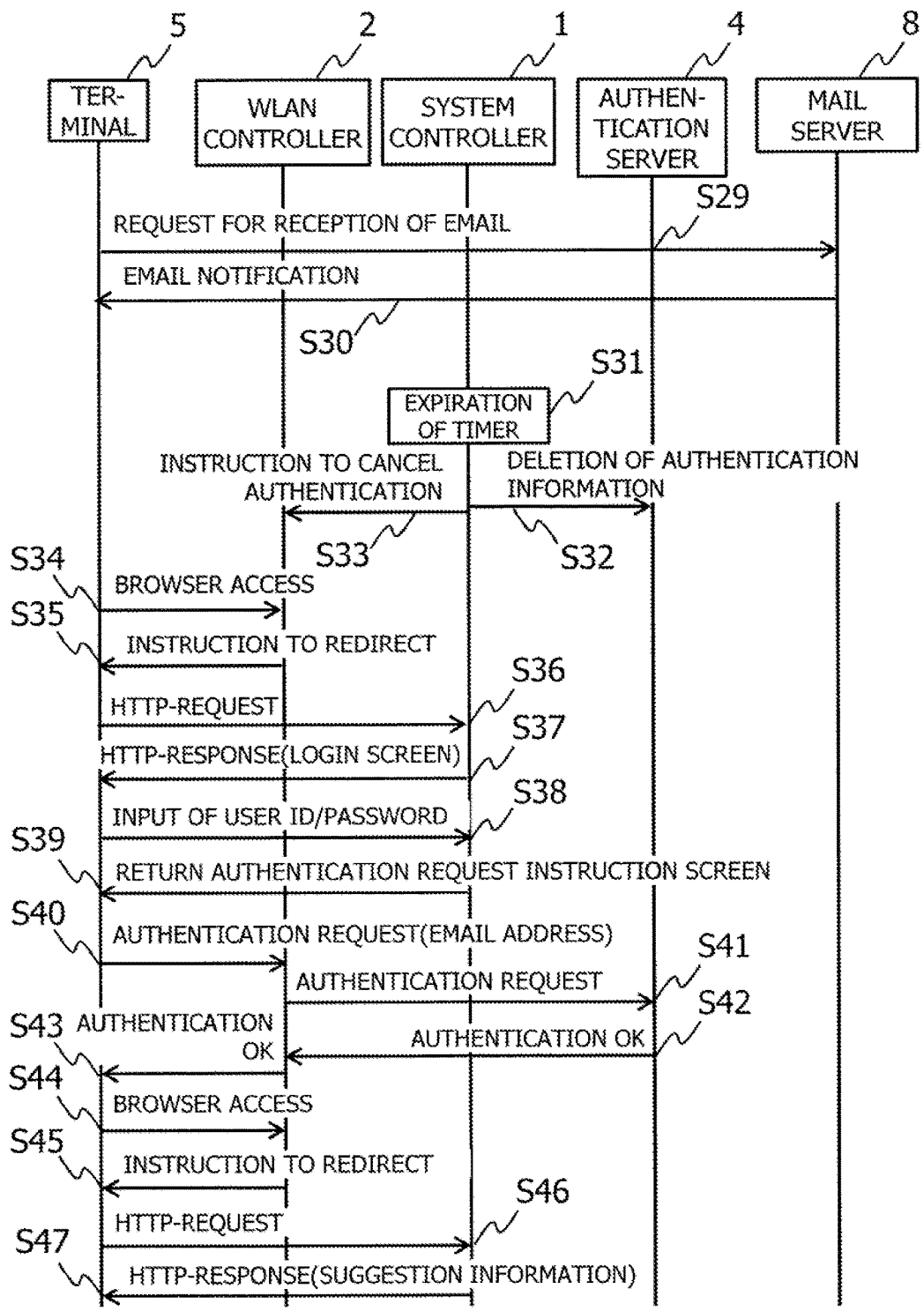
FIG. 14B is an example of a sequence for a case where password authentication is selected.

FIGS. 14A and 14B are an example of a sequence for a case where password authentication is selected. In FIG. 14A, it is assumed that the mobile terminal 5 has no history of connecting to the wireless communication system 100.

In S11, the mobile terminal 5 selects an SSID of the WIFI AP 6 in the tourist site network 300 by a user operation, and connection to the WIFI AP 6 is established. Next, a browser access is caused by a user operation, and the mobile terminal 5 transmits an HTTP request.

In S12, because the mobile terminal 5 is unauthenticated, the wireless LAN controller 2 transmits, in response to the HTTP request from the mobile terminal 5, an HTTP response instructing the mobile terminal 5 to redirect to the system controller 1.

In S13, the mobile terminal 5 transmits the HTTP request to the system controller 1 according to the HTTP response from the wireless LAN controller 2.

In S14, because the HTTP request from the mobile terminal 5 is received for the first time (FIG. 12A, OP2: YES, OP3: YES), the system controller 1 transmits a login screen to the mobile terminal 5 (FIG. 12A, OP4).

In S15, for example, the login screen as illustrated in FIG. 7 is displayed at the mobile terminal 5, and an answer to a questionnaire and an email address are input by a user operation. The mobile terminal 5 transmits an HTTP request including the answer to the questionnaire and the email address to the system controller 1.

In S16, the system controller 1 receives the HTTP request including the answer to the questionnaire and the email address (FIG. 12A, OP7: password), and transmits the authentication request instruction screen in response (FIG. 12B, OP13). In S17, the system controller 1 transmits the email address sent from the mobile terminal 5 to the authentication server 4 as temporary authentication information (FIG. 12B, OP14).

In S18, the system controller 1 starts the timer for restricted authentication, and registers information about the mobile terminal 5 (FIG. 12B, OP12, OP15). At this time, the authentication state of the mobile terminal 5 is recorded as "restricted authentication". In S19, the system controller 1 creates legitimate user ID and password for the user of the mobile terminal 5 (FIG. 12B, OP16), and transmits the same to the authentication server 4 (FIG. 12B, OP17).

In S20, the system controller 1 transmits an authentication information notification email including the legitimate user ID and password with the email address sent from the mobile terminal 5 as the destination (FIG. 12B, OP18). The authentication information notification email is sent to the email server 8.

In S21, in response to the authentication request instruction screen from the system controller 1, the mobile terminal 5 transmits an authentication request including the email address as the authentication information to the wireless LAN controller 2. In S22, the wireless LAN controller 2 transmits the authentication request from the mobile terminal 5 to the authentication server 4.

In S23, because the email address included in the authentication request from the mobile terminal 5 is registered, the authentication server 4 transmits authentication success for the mobile terminal 5 to the wireless LAN controller 2. In S24, the wireless LAN controller 2 holds information of authentication success for the mobile terminal 5, and transmits authentication success to the mobile terminal 5. Thereafter, the wireless LAN controller 2 recognizes that authentication is complete for the mobile terminal 5. The process from S21 to S24 is an authentication process by the wireless LAN controller 2 that is conventionally performed.

In S25, the mobile terminal 5 continues with the browser access which was caused in S11. That is, the mobile terminal 5 transmits the same HTTP request as the HTTP request in S11. In S26, because the HTTP request is an HTTP request immediately after authentication, the wireless LAN controller 2 transmits an HTTP response including an instruction to redirect to the system controller 1, in response to the HTTP request from the mobile terminal 5.

In S27, the mobile terminal 5 transmits the HTTP request to the system controller 1. Additionally, the destination URL of the HTTP request transmitted in S27 is the redirect destination of the HTTP response returned in S26.

In S28, the system controller 1 receives the HTTP request from the mobile terminal 5 (FIG. 12A, OP2), and because the authentication state of the mobile terminal 5 is restricted authentication (FIG. 12E, OP52: restricted authentication), the system controller 1 transmits an HTTP response instructing redirect to the destination URL (FIG. 12E, OP54). Because communication of the mobile terminal 5 is temporarily permitted by restricted authentication, the mobile terminal 5 transmits the HTTP request, and acquires a site on the Internet specified by the destination URL in S11 and displays the same.

In S29 in FIG. 14B, the mobile terminal 5 transmits a reception request for the authentication information notification email to the email server 8 by a user operation. For example, the mobile terminal 5 is notified of arrival of the authentication information notification email by a push notification of an email application. In S30, the mobile terminal 5 is notified of the authentication information notification email by the email server 8.

In S31, time passes, and the timer for restricted authentication becomes expired at the system controller 1 (FIG. 13, OP82: YES). In S32, the system controller 1 instructs the authentication server 4 to delete the temporary authentication information of the mobile terminal 5 (FIG. 13, OP83). In S33, the system controller 1 transmits an instruction to the wireless LAN controller 2 to cancel authentication of the mobile terminal 5 (FIG. 13, OP84).

In S34, a browser access is caused at the mobile terminal 5 by a user operation. At this time, the state of the mobile terminal 5 at the wireless LAN controller 2 is unauthenticated.

In S35, because the mobile terminal 5 is in an unauthenticated state, the wireless LAN controller 2 transmits, to the mobile terminal 5, an HTTP response to redirect to the system controller 1, in response to the HTTP request from the mobile terminal 5.

In S36, according to the HTTP response from the wireless LAN controller 2, the mobile terminal 5 transmits the HTTP request to the system controller 1.

In S37, the system controller 1 receives the HTTP request from the mobile terminal 5, and because the communication is the first communication in the session (FIG. 12A, OP2: YES, OP3: YES), the system controller 1 transmits a login screen to the mobile terminal 5 (FIG. 12A, OP4).

In S38, for example, the login screen illustrated in FIG. 7 is displayed at the mobile terminal 5, and the user ID and the password sent by the authentication information notification email are input by a user operation, and the mobile terminal 5 transmits an HTTP request including the user ID and the password.

In S39, the system controller 1 receives the HTTP request including the user ID and the password (FIG. 12A, OP9: YES), and because the user ID and the password are registered (FIG. 12C, OP31: YES), the system controller 1 transmits an authentication request instruction screen to the mobile terminal 5 (FIG. 12C, OP33). Also, the system controller 1 causes the authentication state of the mobile terminal 5 to be "authenticated" (FIG. 12C, OP34).

In S40, in response to the authentication request instruction screen from the system controller 1, the mobile terminal 5 transmits an authentication request including the user ID and the password sent by the authentication information notification email as the authentication information to the wireless LAN controller 2. In S41, the wireless LAN controller 2 transmits the authentication request from the mobile terminal 5 to the authentication server 4.

In S42, because the user ID and the password included in the authentication request from the mobile terminal 5 are registered (S19), the authentication server 4 transmits authentication success for the mobile terminal 5 to the wireless LAN controller 2. In S43, the wireless LAN controller 2 holds information of authentication success for the mobile terminal 5, and transmits authentication success to the mobile terminal 5. Thereafter, the wireless LAN controller 2 recognizes that authentication is complete for the mobile terminal 5.

In S44, the mobile terminal 5 continues with the browser access which was caused in S34. That is, the mobile terminal 5 transmits the same HTTP request as the HTTP request in S34. In S45, because the HTTP request is an HTTP request immediately after authentication, the wireless LAN controller 2 transmits an HTTP response including an instruction to redirect to the system controller 1, in response to the HTTP request from the mobile terminal 5.

In S46, the mobile terminal 5 transmits the HTTP request to the system controller 1. Additionally, the destination URL of the HTTP request transmitted in S46 is the redirect destination of the HTTP response returned in S45.

In S47, the system controller 1 receives the HTTP request from the mobile terminal 5 (FIG. 12A, OP2: NO), and because the authentication state of the mobile terminal 5 is authenticated (FIG. 12E, OP52: authenticated), the system controller 1 transmits an HTTP response including suggestion information to the mobile terminal 5 (FIG. 12E, OP56). Thereafter, the mobile terminal 5 may connect to any site on the Internet without being redirected to the system controller 1.

Figure 15A:
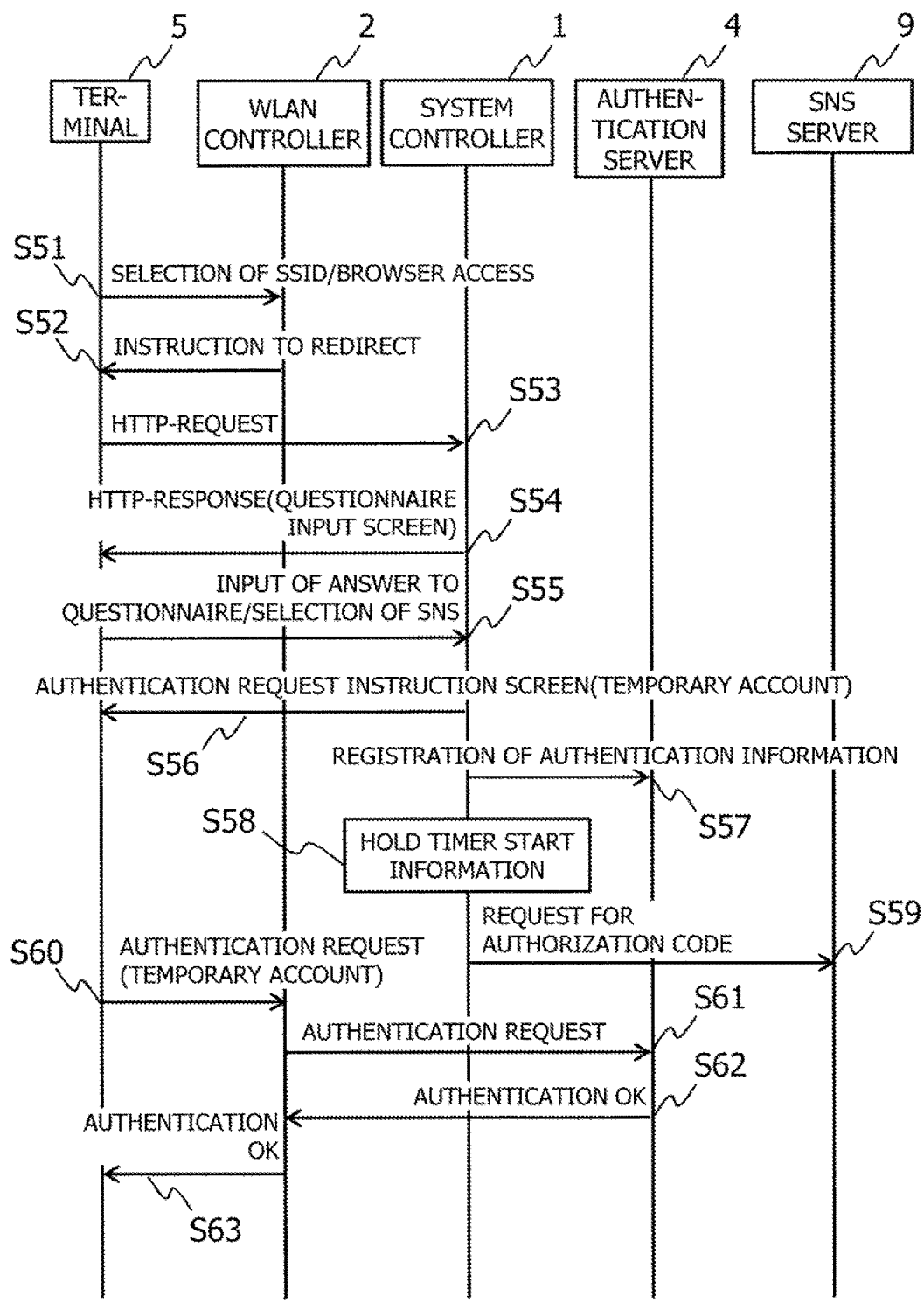
FIG. 15A is an example of a sequence for a case where SNS authentication is selected.
Figure 15B:
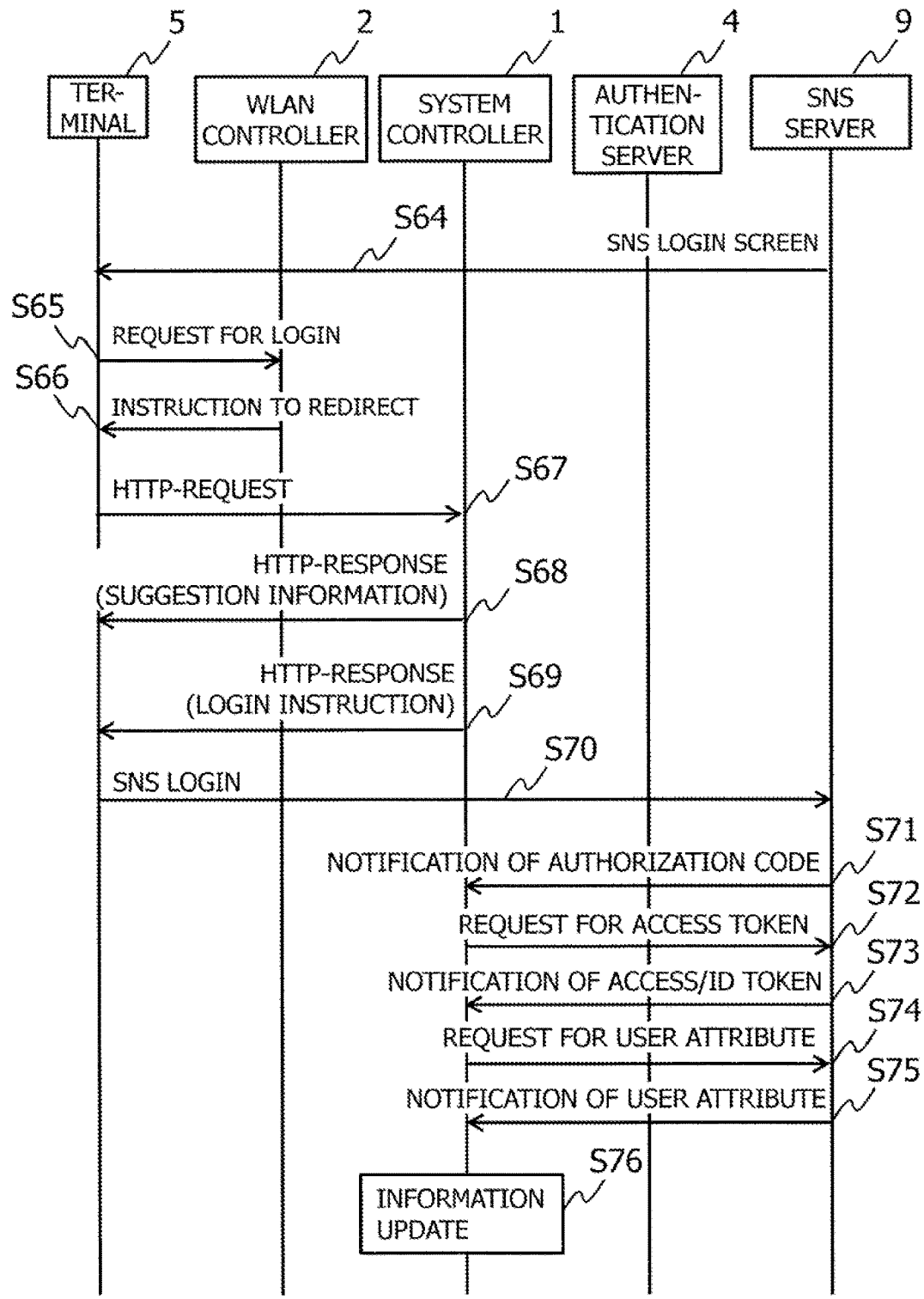
FIG. 15B is an example of a sequence for a case where SNS authentication is selected.

FIGS. 15A and 15B are an example of a sequence for a case where SNS authentication is selected. In FIG. 15A, it is assumed that the mobile terminal 5 has no history of connecting to the wireless communication system 100.

The process from S51 to S54 is the same as the process from S11 to S14 in FIG. 14A, and an HTTP request from the mobile terminal 5 is redirected to the system controller 1 (S51 to S53), and a login screen is transmitted to the mobile terminal 5 from the system controller 1 (S54).

In S55, for example, the login screen illustrated in FIG. 7 is displayed at the mobile terminal 5, and an answer to a questionnaire is input and SNS authentication is selected by a user operation. The mobile terminal 5 transmits an HTTP request including the answer to the questionnaire and information that SNS authentication is toe used to the system controller 1.

In S56, the system controller 1 receives the HTTP request including the answer to the questionnaire and information that SNS authentication is toe used (FIG. 12A, OP7: SNS), and transmits an authentication request instruction screen in response (FIG. 12DA, OP43). A temporary account name created for the mobile terminal 5 is included in the authentication request instruction screen as authentication information. In S57, the system controller 1 transmits, to the authentication server 4, the temporary account name created for the mobile terminal 5 as authentication information (FIG. 12DA, OP44).

In S58, the system controller 1 starts the timer for restricted authentication, and registers information about the mobile terminal 5 (FIG. 12DA, OP42, OP45). At this time, the authentication state of the mobile terminal 5 is recorded as "restricted authentication". In S59, the system controller 1 transmits an authorization code request to the SNS server 9 (FIG. 12DA, OP46). Thereafter, a process according to OAuth2.0, for example, is performed between the system controller 1 and the SNS server 9.

In S60, in response to the authentication request instruction screen from the system controller 1, the mobile terminal 5 transmits an authentication request including the temporary account name as the authentication information to the wireless LAN controller 2. In S61, the wireless LAN controller 2 transmits the authentication request from the mobile terminal 5 to the authentication server 4.

In S62, because the temporary account name included in the authentication request from the mobile terminal 5 is registered (S57), the authentication server 4 transmits authentication success for the mobile terminal 5 to the wireless LAN controller 2. In S63, the wireless LAN controller 2 holds information of authentication success for the mobile terminal 5, and transmits authentication success to the mobile terminal 5. Thereafter, the wireless LAN controller 2 recognizes that authentication is complete for the mobile terminal 5.

In S64, the SNS server 9 transmits a login screen for the SNS to the mobile terminal 5. In S65, an account name and a password for the SNS are input, at the mobile terminal 5, in the login screen for the SNS by a user operation, and the mobile terminal 5 transmits a login request (HTTP request) including the account name and the password for the SNS.

In S66, because the HTTP request is an HTTP request immediately after authentication in S63, the wireless LAN controller 2 transmits an HTTP response including an instruction to redirect to the system controller 1, in response to the HTTP request from the mobile terminal 5.

In S67, the mobile terminal 5 transmits the HTTP request to the system controller 1. Additionally, the destination URL of the HTTP request transmitted in S67 is the redirect destination (the SNS server 9) of the HTTP response returned in S66.

In S68, the system controller 1 receives the HTTP request from the mobile terminal 5 (FIG. 12A, OP2), and because the trail information of the mobile terminal 5 is SNS authentication (FIG. 12E, OP51: SNS), the system controller 1 transmits an HTTP response including suggestion information (FIG. 12F, OP62).

In S69, the system controller 1 transmits, to the mobile terminal 5, a page including an instruction for transmission of an SNS login request (FIG. 12F, OP63).

In S70, the mobile terminal 5 receives the instruction for transmission of an SNS login request from the system controller 1, and transmits, to the SNS server 9, an SNS login request including the account name and the password for the SNS input in the login screen for the SNS received in S64.

In S71, the SMS server 9 authenticates the user of the mobile terminal 5, and notifies the system controller 1 of an authorization code in response to the authorization code request received in S59. The authorization code is information for permitting the system controller 1 to access information of the mobile terminal 5 regarding the SNS. The authorization code is issued when, instead of the system controller 1 directly requesting the mobile terminal 5 for permission, the SNS server 9 acting as a mediator requests the mobile terminal 5 for permission, together with a login screen, and authentication of the mobile terminal 5 is completed.

In S72, the system controller 1 transmits an access token request to the SNS server 9. In S73, the SMS server 9 transmits an access token to the system controller 1 in response to the access token request from the system controller 1. For example, the access token includes an allowed access range and an allowed access period that the system controller 1 is permitted with respect to information of the mobile terminal 5 regarding the SNS.

In S74, the system controller 1 transmits a user attribute request to the SMS server 9. In S75, the SMS server 9 transmits user attribute information of the mobile terminal 5 in response to the user attribute request from the system controller 1. For example, the user attribute information includes the account name of the mobile terminal 5 for the SNS. The processes in S59, S64, S71 to S75 described above are processes according to OAuth2.0, for example.

In S76, the system controller 1 receives the user attribute information from the SNS server 9 (FIG. 12DA, OP47: YES), and updates the information (for example, the SNS account name) about the mobile terminal 5 (FIG. 12DA, OP48). Also, the system controller 1 updates the authentication state of the mobile terminal 5 from "restricted authentication" to "authenticated" (FIG. 12DA, OP48, FIG. 13, OP85: YES), and stops the timer for restricted authentication (FIG. 13, OP86). Thereafter, the mobile terminal 5 is allowed to connect to any site on the Internet without being redirected to the system controller 1.

Effects of First Embodiment

In the first embodiment, a questionnaire is included in a login screen for the wireless communication system 100. Input of an answer to the questionnaire is the condition for connection to the wireless communication system 100, and thus, according to the first embodiment, an answer for a questionnaire may be more reliably collected. Also, because a login screen and a questionnaire answering screen are included in the same screen, operation of the mobile terminal 5 for answering a questionnaire may be reduced, and the burden on the user for answering a questionnaire may be reduced.

Also, in the first embodiment, after authentication of the mobile terminal 5 is completed, the system controller 1 provides the mobile terminal 5 with information according to an answer to a questionnaire. By using a questionnaire asking a user about characteristics or interests as the questionnaire, the system controller 1 may provide useful information according to the attribute, the interests or the like of the user of the mobile terminal 5, for example. Additionally, information (suggestion information) that is provided to the mobile terminal 5 after completion of authentication of the mobile terminal 5 is a site about a tourist attraction, a site introducing gourmet food in a tourist site, a voucher that cane used at a tourist site, or the like.

Furthermore, when an answer to a questionnaire is acquired from the mobile terminal 5, the system controller 1 temporarily permits the mobile terminal 5 to connect to the wireless communication system 100. This allows the mobile terminal 5 to connect to the Internet through the wireless communication system 100, and to receive an email including a user ID and a password, or to login to an SNS. Accordingly, even if the mobile terminal 5 includes no other wireless communication function than the function of WIFI, the mobile terminal 5 may use the wireless communication system 100 at a location for connecting to the wireless communication system 100 with no advance setting.

According to a control device, a wireless communication control method, and a wireless communication control program of the disclosure, information about a user of a wireless access network may be efficiently collected.

Others

In the first embodiment, reception of an answer to a questionnaire from the mobile terminal 5 is one of conditions for starting restricted authentication, but reception of an answer does not have to be included in the conditions for starting restricted authentication. It is sufficient if an answer to a questionnaire is received from the mobile terminal 5 before completion of authentication by legitimate user ID and password or authentication by the SMS server is performed. Reception of an answer to a questionnaire from the mobile terminal 5 is one of conditions for permitting the mobile terminal 5 to access a wireless access network.

At the time of starting restricted authentication, the system controller 1 may instruct the wireless LAN controller 2 to directly permit communication of the mobile terminal 5 (to shift the state to the authenticated state). The instruction from the system controller 1 to the wireless LAN controller 2 is issued through a command line, for example. For example, when the timer is expired, or when legitimate user ID and password are received from the mobile terminal 5 before the timer is expired, or when user attribute information is received from the SNS server 9, the system controller 1 may cause the wireless LAN controller 2 to cancel the authentication state of the mobile terminal 5. In these cases, the system controller 1 may omit processes such as registration of temporary authentication information in the authentication server 4, and transmission of an authentication request instruction screen to the mobile terminal 5.

In the first embodiment, the restriction on the restricted authentication is a time restriction. However, the restriction on the restricted authentication is not limited to the time restriction. For example, in the case where the management system 200 is an SDN, the system controller 1 is an SDN controller, and the wireless LAN controller 2 is an SDN switch, the system controller 1 may more finely control the wireless LAN controller 2.

The system controller 1 as the SDN controller specifies a source and a destination of communication, a protocol (port number), or the like to restrict communication of the mobile terminal 5. For example, the wireless LAN controller 2 permits communication of the mobile terminal 5 for receiving emails but does not permit other communication, according to the content of a restriction.

Recording Medium

A program for causing a computer, other machines or devices (hereinafter "computer or the like") to achieve one of the functions described above may be recorded in a recording medium that cane ready the computer or the like. A function may be provided by causing the computer or the like to read and execute the program in the recording medium.

The recording medium that can be ready the computer or the like refers to a non-transitory recording medium that accumulates information such as data and programs electrically, magnetically, optically, mechanically or by chemical action and that cane read by the computer or the like. Among such recording mediums, those that can be removed from the computer or the like include a flexible disc, a magneto-optic disc, a CD-ROM, a CD-R/W, a DVD, a Blu-ray disc, a DAT, an 8 mm tape, a memory card such as a flash memory, and the like. Also, a hard disc, a ROM (Read Only Memory), and the like may be cited as the recording mediums fixed in the computer or the like. Moreover, an SSD (Solid State Drive) may be used as a recording medium that cane removed from the computer or the like, and as a recording medium that is fixed in the computer or the like.

All examples and conditional language provided herein are intended for the pedagogical purposes of aiding the reader in understanding the invention and the concepts contributed by the inventor to further the art, and are to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A control device comprising:
a memory; and
a processor coupled to the memory and the processor configured to:
transmit a login screen including an input section for an answer to a questionnaire to a mobile terminal that is not permitted to access a wireless access network, when a connection request is received from the mobile terminal,
receive login information and an answer to the questionnaire input in the login screen,
start an authentication process using an external server based on the received login information,
issue a first access permission, with a restriction, for allowing the mobile terminal to perform communication to the external server through the wireless access network, under a condition that the received answer to the questionnaire is input, and
issue a second access permission for lifting the restriction on the communication of the mobile terminal, when authentication of the mobile terminal by the authentication process is complete,
wherein the processor is configured to
determine a first access destination in response to the received answer to the questionnaire, wherein contents in the first access destination are related to the received answer to the questionnaire, from a storage unit that stores an answer to the questionnaire and an access destination for information according to the answer to the questionnaire, and
transmit the first access destination to the mobile terminal after issuance of the second access permission, and
wherein the first access permission sets a restriction time for communication to the external server, and the processor is configured to permit communication of the mobile terminal to outside through the wireless access network for a period of the restriction time.

2. The control device according to claim 1, wherein the processor is configured to stop a timer for the restriction time in the second access permission.

3. The control device according to claim 1, wherein,
in a process for the first access permission, the processor is configured to register authentication information of the mobile terminal in an authentication device of the wireless access network, wherein the authentication device permits communication of the mobile terminal according to Successful authentication, and the processor is configured to transmit, to the mobile terminal, an instruction for transmission of an authentication request.

4. The control device according to claim 3, wherein,
when a timer for the restriction time is expired, the processor is configured to delete the authentication information that, is registered in the authentication device, and place the mobile terminal in an unauthenticated State.

5. The control device according to claim 3, wherein
the processor is configured to transmit an email including a password to an email address, when the email address is included in the login information from the mobile terminal and transmit the instruction for transmission of an authentication request to the mobile terminal, and detect completion of the authentication when the password is included in the login information from the mobile terminal.

6. The control device according to claim 1, wherein
the processor is configured to request a predetermined SNS (Social Networking Service) server, as the external server, for authentication of the mobile terminal, when a login request for a predetermined SNS is included in the login information from the mobile terminal, and detect completion of the authentication when a notification of completion of authentication of the mobile terminal is received from the predetermined SNS Sever.

7. A wireless communication control method to be performed by a control device, the method comprising:
transmitting a login screen including an input section for an answer to a questionnaire to a mobile terminal that is not permitted to access a wireless access network, when a connection request is received from the mobile terminal,
receiving login information and an answer to the questionnaire input in the login screen,
starting an authentication process using an external server based on the received login information,
issuing a first access permission, with a restriction, for allowing the mobile terminal to perform communication to the external server through the wireless access network, under a condition that the received answer to the questionnaire is input,
issuing a second access permission for lifting the restriction on the communication of the mobile terminal, when authentication of the mobile terminal by the authentication process is complete,
determining a first access destination in response to the received answer to the questionnaire, wherein contents in the first access destination are related to the received answer to the questionnaire, from a storage unit that stores an answer to the questionnaire and an access destination for information according to the answer to the questionnaire, and
transmitting the first access destination to the mobile terminal after issuance of the second access permission,
wherein the first access permission sets a restriction time for communication to the external server, and the method includes permitting communication of the mobile terminal to outside through the wireless access network for a period of the restriction time.

8. A non-transitory computer-readable medium recorded with a wireless communication control program that causes a control device to:

transmit a login screen including an input section for an answer to a questionnaire to a mobile terminal that is not permitted to access a wireless access network, when a connection request is received from the mobile terminal, receive login information and an answer to the questionnaire input in the login screen, start an authentication process using an external server based on the received login information, issue a first access permission, with a restriction, for allowing the mobile terminal to perform communication to the external server through the wireless access network, under a condition that the received answer to the questionnaire is input, issue a second access permission for lifting the restriction on the communication of the mobile terminal, when authentication of the mobile terminal by the authentication process is complete, determine a first access destination in response to the received answer to the questionnaire, wherein contents in the first access destination are related to the received answer to the questionnaire, from a storage unit that stores an answer to the questionnaire and an access destination for information according to the answer to the questionnaire, and transmit the first access destination to the mobile terminal after issuance of the second access permission, and wherein the first access permission sets a restriction time for communication to the external server, and the wireless communication control program causes the control device to permit communication to the mobile terminal to outside through the wireless access network for a period of the restriction time.

* * * * *